US012434250B2

(12) United States Patent
Azenkeng et al.

(10) Patent No.: US 12,434,250 B2
(45) Date of Patent: Oct. 7, 2025

(54) METHOD OF FORMING GRAPHENE QUANTUM DOTS FROM COAL

(71) Applicant: Energy and Environmental Research Center Foundation, Grand Forks, ND (US)

(72) Inventors: Alexander Azenkeng, Grand Forks, ND (US); Jason D. Laumb, Grand Forks, ND (US)

(73) Assignee: Energy & Environmental Research Center, Grand Forks, ND (US)

( * ) Notice: Subject to any disclaimer, the term of this patent is extended or adjusted under 35 U.S.C. 154(b) by 0 days.

(21) Appl. No.: 18/602,454

(22) Filed: Mar. 12, 2024

(65) Prior Publication Data

US 2024/0269689 A1 Aug. 15, 2024

Related U.S. Application Data

(63) Continuation of application No. 17/445,870, filed on Aug. 25, 2021, now Pat. No. 11,958,056.

(Continued)

(51) Int. Cl.
*B03B 9/00* (2006.01)
*B03B 7/00* (2006.01)
(Continued)

(52) U.S. Cl.
CPC ............. *B03B 9/005* (2013.01); *B03B 7/00* (2013.01); *C01B 32/184* (2017.08);
(Continued)

(58) Field of Classification Search
CPC ......... B03B 9/005; B03B 7/00; C01B 32/184; C01B 32/194; C01B 2204/02; C01B 2204/22; C01B 2204/00; C01B 2204/04; C01B 2204/06; C01B 2204/065; C01B 2204/20; C01B 2204/24; C01B 2204/26; C01B 2204/28; C01B 2204/30; C01B 2204/32; C09K 11/65; B82Y 20/00; B82Y 40/00; B82Y 30/00; C01P 2004/64;
(Continued)

(56) References Cited

U.S. PATENT DOCUMENTS 11,958,056 B2 *  4/2024  Azenkeng ............... B03B 9/005
2016/0060122 A1 *  3/2016  Tour ...................... C01B 32/182
                                                              564/123

(Continued)

OTHER PUBLICATIONS

Lyubutin, et al., Synthesis and characterization of graphene modified by iron oxide nanoparticles, Matericals Chemistry and Physics 2018; 219: 411-420 (Year: 2018).*

(Continued)

*Primary Examiner* — Daniel C. McCracken
(74) *Attorney, Agent, or Firm* — Schwegman Lundberg & Woessner, P.A.

(57) ABSTRACT

Upgraded coal, method of forming the same, and graphene films and quantum dots made therefrom. A method of upgrading coal includes cleaning coal to form a cleaned coal residue. The method also includes (A) reacting the cleaned coal residue with an oxidizable inorganic metallic agent, or (B) reacting the cleaned coal residue with a reducing agent, or a combination thereof, to form the upgraded coal.

20 Claims, 11 Drawing Sheets

Related U.S. Application Data

(60) Provisional application No. 62/706,620, filed on Aug. 28, 2020.

(51) Int. Cl.
| | |
|---|---|
| *B82Y 20/00* | (2011.01) |
| *B82Y 40/00* | (2011.01) |
| *C01B 32/184* | (2017.01) |
| *C01B 32/194* | (2017.01) |
| *C09K 11/65* | (2006.01) |

(52) U.S. Cl.
CPC ............ *C01B 32/194* (2017.08); *C09K 11/65* (2013.01); *B82Y 20/00* (2013.01); *B82Y 40/00* (2013.01); *C01B 2204/02* (2013.01); *C01B 2204/22* (2013.01); *C01P 2004/64* (2013.01); *C01P 2006/40* (2013.01); *C01P 2006/60* (2013.01)

(58) Field of Classification Search
CPC .............. C01P 2006/40; C01P 2006/60; C10L 2290/20; C10L 9/02
See application file for complete search history.

(56) References Cited

U.S. PATENT DOCUMENTS

| | | | |
|---|---|---|---|
| 2019/0194022 A1* | 6/2019 | Atkins | .................. C01B 32/336 |
| 2022/0062917 A1 | 3/2022 | Azenkeng et al. | |
| 2023/0017556 A1 | 1/2023 | Azenkeng et al. | |
| 2023/0278874 A1 | 9/2023 | Azenkeng et al. | |

OTHER PUBLICATIONS

Pumera, et al., Highly conductive graphene nanoribbons from the reduction of graphene oxide nanoribbons with lithium aluminum hydride, J. Mater. Chem. C 2014; 2: 856-863 (Year: 2014).*

Zhang, et al., Effect of acid treatment on the characteristics and structures of high-sulfur bituminous coal, Fuel 2016; 184: 418-429 (Year: 2016).*

"U.S. Appl. No. 17/445,870, Non Final Office Action mailed Jul. 28, 2023", 18 pgs.

"U.S. Appl. No. 17/445,870, Notice of Allowance mailed Dec. 27, 2023", 14 pgs.

"U.S. Appl. No. 17/445,870, Response filed May 2, 2023 to Restriction Requirement mailed Mar. 27, 2023", 7 pgs.

"U.S. Appl. No. 17/445,870, Response filed Oct. 11, 2023 to Non Final Office Action mailed Jul. 28, 2023", 11 pgs.

"U.S. Appl. No. 17/445,870, Restriction Requirement mailed Mar. 27, 2023", 13 pgs.

Asenbauer, Jakob, et al., "The success story of graphite as a lithium-ion anode material—fundamentals, remaining challenges, and recent developments including silicon (oxide) composites", Sustainable Energy Fuels, 4(11), (2020), 5363-5870.

Bianco, et al., "All in the graphene family—A recommended nomenclature for two-dimensional carbon materials", Carbon, 65, (2013), 6 pgs.

Bresser, Dominic, et al., "Perspectives of automotive battery R&D in China, Germany, Japan, and the USA", Journal of Power Sources 382, (2018), 6 pgs.

Cooke, N.E., et al., "Investigation to Develop Methods for Removal of Oxygen from Coals", The Canadian Journal of Chemical Engineering, 63(1), pp. 162-165, (Feb. 1985), 5 pgs.

Dunn, Bruce, et al., "Electrical Energy Storage for the Grid: A Battery of Choices", Science, 334(6058), (928-935), Nov. 18, 2011.

Lyubutin, et al., "Synthesis and characterization of graphene modified by iron oxide nanoparticles", Matericals Chemistry and Physics, 219, (2018), 411-420.

Pumera, et al., "Highly conductive graphene nanoribbons from the reduction of graphene oxide nanoribbons with lithium aluminum hydride", J. Mater. Chem. C; 2, (2014), 856-863.

Qiu, Tian, et al., "Preparation of coal-based graphite with different microstructures by adjusting the content of ash and volatile matter in raw coal", Energy Sources, Part A: Recovery, Utilization, and Environmental Effects, 42(15), pp. 1874-1881, (2020), 9 pgs.

Rahman, et al., "Review on chemical upgrading of coal: Production process, potential applications and recent developments", Fuel Processing Technology, (2017), 35-56.

Rozelle, et al., "Coal Upgrading Technologies and the Extraction of Useful Materials from Coal Mine Products", History and Opportunities, United States Department of Energy Office of Fossil Energy, (Mar. 2018), 61 pgs.

Scrosati, Bruno, "Lithium batteries: Status, prospects and future", Journal of Power Sources 195, (2010), 2419-2430.

Zhang, et al., "Effect of acid treatment on the characteristics and structures of high-sulfur bituminous coal", Fuel 184, (2016), 418-429.

"European Application Serial No. 24171320.5, Extended European Search Report mailed Sep. 18, 2024", 9 pgs.

"European Application Serial No. 24171320.5, Response filed Apr. 30, 2025 to Extended European Search Report mailed Sep. 18, 2024", w claims, 14 pgs.

* cited by examiner

METHOD OF FORMING GRAPHENE QUANTUM DOTS FROM COAL

CROSS-REFERENCE TO RELATED APPLICATION

This application is a continuation of U.S. patent application Ser. No. 17/445,870, filed Aug. 25, 2021, which application claims the benefit of priority to U.S. Provisional Patent Application Ser. No. 62/706,620 filed Aug. 28, 2020, the disclosures of which are incorporated herein in their entireties.

BACKGROUND

Naturally-sourced coal such as low-rank coal (e.g., sub-bituminous coal and lignite) can have undesirable properties such as low carbon concentration, high oxygen concentration, and high ash content. Such properties can make the coal less suitable for energy generation and production of high value materials such as graphene films.

Graphene is the name denoted to a single sheet (1 atom thick) of $sp^2$-bonded carbon atoms. Effectively this is a single sheet of graphitic carbon. However, the term graphene has also come to be used to describe in a more general sense thin films (1-40 layers) of $sp^2$-bonded carbon under the auspices of discussions of single layer interactions and electrical behavior. Due to the difficulty in mass producing graphene films, it remains an extremely expensive material.

Graphene quantum dots are nanoparticles having a size of 1 nm to 20 nm. Because the electrons and holes in the quantum dot are subjected to quantum confinement, a continuous band structure changes into a discrete band structure and quantum dots may emit fluorescence after being excited. Graphene quantum dots can be difficult and expensive to produce.

SUMMARY OF THE INVENTION

In various aspects, the present invention provides a method of upgrading coal. The method includes cleaning coal to form a cleaned coal residue. The method also includes (A) reacting the cleaned coal residue with an oxidizable inorganic metallic agent, or (B) reacting the cleaned coal residue with a reducing agent, or a combination thereof, to form the upgraded coal.

In various aspects, the present invention provides a method of upgrading coal. The method includes cleaning coal having a largest dimension of 25 mm or less using a strong mineral acid at a temperature of 30° C. to 100° C. to form a cleaned coal residue. The method also includes (A) reacting the cleaned coal residue at 100° C. to 500° C. under an inert gas with an oxidizable inorganic metallic agent including iron (II) sulfate heptahydrate ($FeSO_4 \cdot 7H_2O$), iron (II) chloride tetrahydrate ($FeCl \cdot 4H_2O$), or a combination thereof; or (B) reacting the cleaned coal residue at 0° C. to 50° C. in an organic solvent with a reducing agent including lithium aluminum hydride (LAH), sodium borohydride (NAH), or a combination thereof; or a combination of (A) and (B); to form the upgraded coal. The upgraded coal has a lower ash content, as compared to the coal used to form the upgraded coal. The upgraded coal has at least one of a lower oxygen concentration and a higher carbon concentration, as compared to the naturally-sourced coal used to form the upgraded coal.

In various aspects, the present invention provides an upgraded coal formed by the method. In various aspects, the present invention provides a graphene film formed from the upgraded coal. In various aspects, the present invention provides a graphene quantum dot formed from the upgraded coal.

In various aspects, the present invention provides an upgraded coal including an ash content of less than 5 wt %; an oxygen concentration of 10 wt % to 25 wt %; and a carbon concentration of 40 wt % to 75 wt %.

In various aspects, the present invention provides a graphene film formed from the upgraded coal. In various aspects, the present invention provides a graphene quantum dot formed from the upgraded coal.

In various aspects, the present invention provides a graphene quantum dot having one or more fluorescence emission maxima at 395 nm excitation of 450 nm to 550 nm.

Various embodiments of the present invention have advantages over other upgraded coals and methods of making the same. For example, in various embodiments, the upgraded coal of the present invention can have an ash content of less than 5 wt %, such as 0.5 wt % to 2 wt %. The ash content can be 4 wt % to 15 wt % lower than an ash content of the starting material naturally-sourced coal. In various embodiments, the upgraded coal of the present invention can have a lower oxygen concentration than the starting material naturally-sourced coal, such as an oxygen concentration that is 1-50% less. In various embodiments, the upgraded coal of the present invention can have a higher carbon concentration than the starting material naturally-sourced coal, such as a carbon concentration that is 1-30% higher. In various embodiments, the upgraded coal can have a lower volatile matter (VM) content than other lignite coals, e.g., a VM that is 13% to 19% lower relative to the starting naturally-sourced coal. In various embodiments, the upgraded coal can have a sulfur content that is lower than the sulfur content in the starting raw coal, such as 4% lower or more. In various embodiments, the upgraded coal can be converted to energy with greater efficiency (e.g., higher energy density) and with less production of ash. In various embodiments, the upgraded coal can be converted to graphite more efficiently than other lignite coals. In various embodiments, the upgraded coal can be converted to graphene films and/or graphene quantum dots more efficiently and/or with a higher quality of product than other coals.

BRIEF DESCRIPTION OF THE FIGURES

The drawings illustrate generally, by way of example, but not by way of limitation, various embodiments of the present invention.

DETAILED DESCRIPTION OF THE INVENTION

Figure 1:
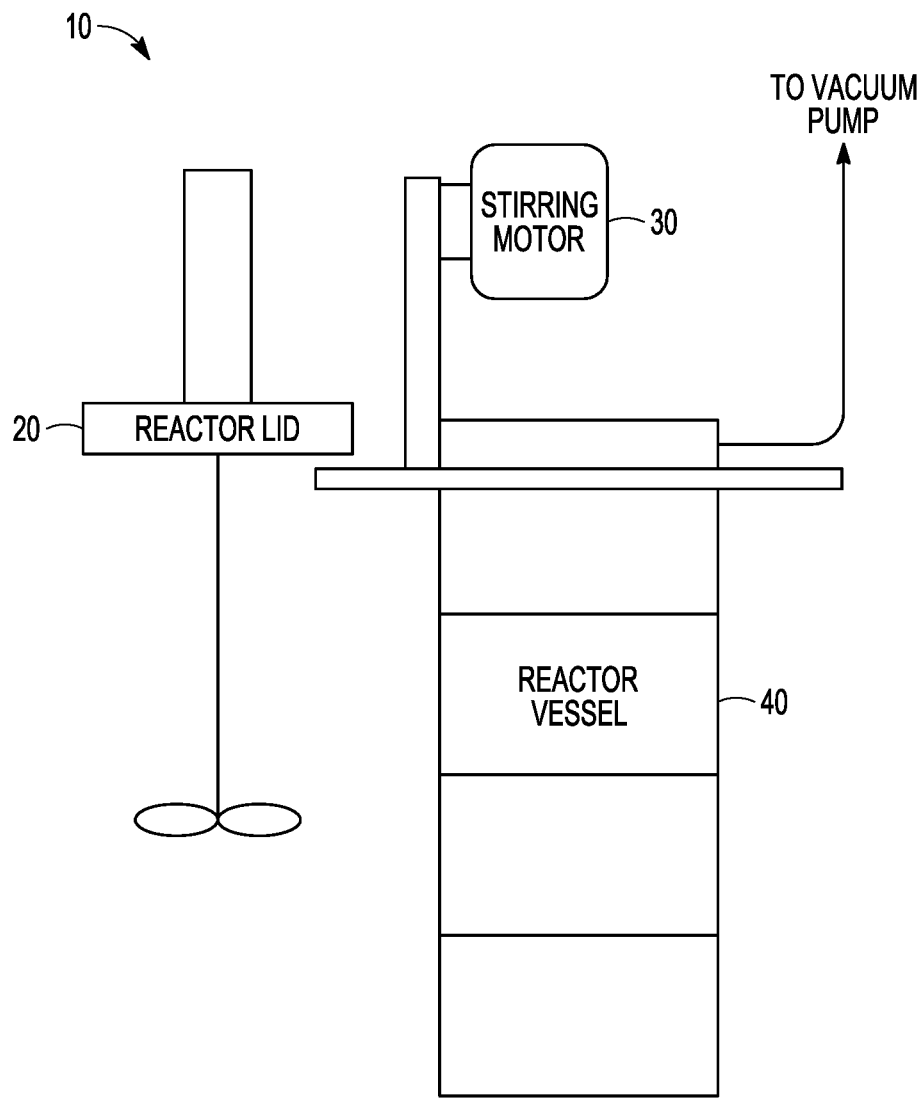
FIG. 1 illustrates a schematic of an autoclave reactor system, in accordance with various embodiments.

Reference will now be made in detail to certain embodiments of the disclosed subject matter. While the disclosed subject matter will be described in conjunction with the enumerated claims, it will be understood that the exemplified subject matter is not intended to limit the claims to the disclosed subject matter.

Throughout this document, values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "about 0.1% to about 5%" or "about 0.1% to 5%" should be interpreted to include not just about 0.1% to about 5%, but also the individual values (e.g., 1%, 2%, 3%, and 4%) and the sub-ranges (e.g., 0.1% to 0.5%, 1.1% to 2.2%, 3.3% to 4.4%) within the indicated range. The statement "about X to Y" has the same meaning as "about X to about Y," unless indicated otherwise. Likewise, the statement "about X, Y, or about Z" has the same meaning as "about X, about Y, or about Z," unless indicated otherwise.

In this document, the terms "a," "an," or "the" are used to include one or more than one unless the context clearly dictates otherwise. The term "or" is used to refer to a nonexclusive "or" unless otherwise indicated. The statement "at least one of A and B" or "at least one of A or B" has the same meaning as "A, B, or A and B." In addition, it is to be understood that the phraseology or terminology employed herein, and not otherwise defined, is for the purpose of description only and not of limitation. Any use of section headings is intended to aid reading of the document and is not to be interpreted as limiting; information that is relevant to a section heading may occur within or outside of that particular section.

In the methods described herein, the acts can be carried out in any order without departing from the principles of the invention, except when a temporal or operational sequence is explicitly recited. Furthermore, specified acts can be carried out concurrently unless explicit claim language recites that they be carried out separately. For example, a claimed act of doing X and a claimed act of doing Y can be conducted simultaneously within a single operation, and the resulting process will fall within the literal scope of the claimed process.

The term "about" as used herein can allow for a degree of variability in a value or range, for example, within 10%, within 5%, or within 1% of a stated value or of a stated limit of a range, and includes the exact stated value or range.

The term "substantially" as used herein refers to a majority of, or mostly, as in at least about 50%, 60%, 70%, 80%, 90%, 95%, 96%, 97%, 98%, 99%, 99.5%, 99.9%, 99.99%, or at least about 99.999% or more, or 100%. The term "substantially free of" as used herein can mean having none or having a trivial amount of, such that the amount of material present does not affect the material properties of the composition including the material, such that about 0 wt % to about 5 wt % of the composition is the material, or about 0 wt % to about 1 wt %, or about 5 wt % or less, or less than, equal to, or greater than about 4.5 wt %, 4, 3.5, 3, 2.5, 2, 1.5, 1, 0.9, 0.8, 0.7, 0.6, 0.5, 0.4, 0.3, 0.2, 0.1, 0.01, or about 0.001 wt % or less, or about 0 wt %.

Method of Upgrading Coal.

Various aspects of the present invention provide a method of upgrading coal. The method includes cleaning coal to form a cleaned coal residue. The method includes (A) reacting the cleaned coal residue with an oxidizable inorganic metallic agent; or, (B) reacting the cleaned coal residue with a reducing agent; or, a combination of (A) and (B); to form the upgraded coal.

The coal that is cleaned (e.g., the starting material coal) can be any suitable coal. The coal can be a naturally-sourced coal. The starting material coal can be a modified or upgraded coal.

The starting material coal can be a crushed coal or a particulate coal. The crushed coal or particulate coal can have any suitable size, such as having a largest dimension of 25 mm or less, or 1 micron to 25 mm, or 1 micron to 10 mm, or less than or equal to 25 mm but greater than or equal to 1 micron, 2, 3, 4, 5, 6, 8, 10, 12, 14, 15, 20, 25, 30, 40, 50, 75, 100, 150, 200, 250, 300, 400, 500, 750, 1 mm, 2, 3, 4, 5, 6, 7, 8, 9, 10, 11, 12, 13, 14, 15, 16, 17, 18, 19, 20, 21, 22, 23, or 24 mm.

The cleaning of the coal to form the cleaned coal residue can be any suitable cleaning, such as cleaning the coal with a mineral acid, cleaning the coal with a base, physically cleaning the coal, or a combination thereof.

The cleaning of the coal to form the cleaned coal residue can include cleaning the coal with a base (e.g., an aqueous solution of a base). The base cleaning can be followed by washing with water to remove residual base therefrom and drying of the coal to remove some or all of the water.

The cleaning of the coal to form the cleaned coal residue can include physically cleaning the coal. The physical cleaning can include placing the coal in an aqueous solution of suitable density, as controlled by dissolution of a salt therein, and removing one or more desired fractions of the coal from the surface, bottom, or middle sections of the aqueous solution. For example, the physical cleaning can include suspending the coal in an aqueous solution comprising a salt such as cesium chloride. The aqueous solution can have any suitable specific gravity, such as a specific gravity of 1 to 2, or 1.4 to 1.6, or less than or equal to 2 but greater than or equal to 1, 1.1, 1.2, 1.3, 1.4, 1.5, 1.6, 1.7, 1.8, or 1.9.

The cleaning of the coal to form the cleaned coal residue can include cleaning the coal with a mineral acid, such as a strong mineral acid. The cleaning of the coal with the mineral acid can remove one or more inorganic elements from the coal, thereby reducing the ash content of the coal. The mineral acid can be any suitable mineral acid, such as phosphoric acid, sulfuric acid, boric acid, hydrofluoric acid, hydrobromic acid, perchloric acid, hydrochloric acid, nitric acid, or a combination thereof. The mineral acid can include hydrochloric acid, nitric acid, or a combination thereof. The mineral acid can include hydrochloric acid. The mineral acid can include nitric acid. The mineral acid can be of any suitable strength, such as 0.1 M to 10 M, 1 M to 5 M, 1 M to 1.5 M, or equal to or less than 10 M but greater than or equal to 0.1 M, 0.2, 0.4, 0.6, 0.8, 1, 1.1, 1.2, 1.3, 1.4, 1.5, 1.6, 1.8, 2, 2.5, 3, 3.5, 4, 4.5, 5, 6, 7, 8, or 9 M. During the acid cleaning, a ratio of a volume of the mineral acid to a weight of the coal can be 1:10 to 10:1, or 2:1 to 4:1, or less than or equal to 10:1 but greater than or equal to 1:10, 1:9, 1:8, 1:7, 1:6, 1:5, 1:4, 1:3, 1:2, 1:1, 2:1, 3:1, 4:1, 5:1, 6:1, 7:1, 8:1, or 9:1. The cleaning of the coal with the mineral acid can be conducted at any suitable temperature, such as a temperature of 30° C. to 100° C., 60° C. to 80° C., or less than or equal to 100° C. but greater than or equal to 30° C., 35, 40, 45, 50, 55, 60, 65, 70, 75, 80, 85, 90, or 95° C. The coal can be cleaned with the mineral acid, and the temperature can be maintained, for any suitable duration, such as 1 h to 72 h, 12 h to 36 h, or greater than or equal to 1 h, 2, 4, 6, 8, 10, 12, 14, 16, 18, 20, 22 h, 1 d, 1.5, 2, 2.5, or 3 d or more. The cleaning of the coal with the mineral acid can be conducted at any suitable pressure, such as atmospheric pressure.

The method can further include washing the cleaned coal residue with an aqueous liquid. For example, the washing can be performed after the physical cleaning to remove residual acid or base from the coal, or residual salts left on the coal from an aqueous solution used for physical cleaning. The method can further include drying the coal to remove water therefrom prior to subsequent steps of the method.

The method can optionally include a size reduction step after the cleaning. The size reducing step can include crushing or grinding the coal residue to reduce the particle size thereof, to a size that is smaller than the coal prior to the cleaning. The smaller size can include a largest dimension of 500 microns or less, such as 1 micron to 100 microns, such as less than or equal to 500 microns but greater than or equal to 1 micron, 2, 3, 4, 5, 6, 8, 10, 12, 14, 15, 20, 25, 30, 40, 50, 75, 100, 200, 300, or 400 microns.

The method can include reacting the cleaned coal residue with an oxidizable inorganic metallic agent. The reacting of the cleaned coal residue with the oxidizable inorganic metallic agent can remove one or more heteroatoms from the cleaned coal residue, such as oxygen, sulfur, or a combination thereof. The oxidizable inorganic metallic agent can be any suitable material that removes one or more heteroatoms from the cleaned coal residue, such as a salt including iron(II), cerium(III), manganese(II), cobalt(II), chromium (III), copper(I), tin(II), or a combination thereof. The oxidizable inorganic metallic acid can include iron sulfate or a hydrate thereof. The oxidizable inorganic metallic agent can include iron (II) sulfate heptahydrate ($FeSO_4 \cdot 7H_2O$). The oxidizable inorganic metallic agent can include iron chloride or a hydrate thereof. The oxidizable inorganic metallic agent can include iron (II) chloride tetrahydrate ($FeCl \cdot 4H_2O$). The oxidizable inorganic metallic can be reacted with the cleaned coal residue in a suitable solvent, such as an aqueous solvent.

The reacting of the cleaned coal residue with the oxidizable inorganic metallic agent can be performed in a reactor, such as an autoclave. The reacting of the cleaned coal residue with the oxidizable inorganic metallic agent can be performed at any suitable reaction temperature, such as 100° C. to 500° C., 250° C. to 350° C., or less than or equal to 500° C. but greater than or equal to 100° C., 120, 140, 160, 180, 200, 220, 240, 250, 260, 270, 280, 290, 300, 310, 320, 330, 340, 350, 360, 380, 400, 420, 440, 460, or 480° C. The reacting of the cleaned coal residue with the oxidizable inorganic metallic agent can be performed under any suitable gas environment, such as under air, or under an inert gas such as argon. The reaction of the cleaned coal residue with the oxidizable inorganic metallic agent can be performed in an environment that has been evacuated and flushed with an inert gas (e.g., argon) one or more times. The reaction of the cleaned coal residue with the oxidizable inorganic metallic agent can be performed in the substantial absence of oxygen (e.g., less than 0.01 vol %, or less than 0.0001 vol %). The reaction of the cleaned coal residue with the oxidizable inorganic metallic agent can be performed for any suitable duration, during which the reaction temperature is maintained, such as 30 min to 5 h, 1 h to 3 h, or at least 30 min, 1 h, 2, 3, 4, or 5 h, or less than or equal to 5 h but greater than or equal to 30 min, 1 h, 1.5, 2, 2.5, 3, 3.5, 4, or 4.5 h.

After the reaction of the cleaned coal residue with the oxidizable inorganic metallic agent, the reaction mixture can be actively or passively cooled, such as to room temperature. After the reaction of the cleaned coal residue with the oxidizable inorganic metallic agent, the cleaned coal residue can be washed with water one or more times to remove residual oxidizable inorganic metallic agent or other undesired material from the coal. After the reaction of the cleaned coal residue with the oxidizable inorganic metallic agent, the cleaned coal residue can be dried to remove water therefrom.

The method can include reacting of the cleaned coal residue with the reducing agent. The reacting of the cleaned coal residue with the reducing agent can remove organic functional groups from the cleaned coal residue, such as carboxylic acids, carbonyl groups, ethers, aliphatic groups, or a combination thereof. The reacting of the cleaned coal residue with the reducing agent can reduce C=O groups in the cleaned coal residue (e.g., to alcohols, and/or with complete removal of the oxygen atom). The reducing agent can be any suitable reducing agent, such as lithium aluminum hydride, sodium borohydride, diborane, 9-BBN, aluminum hydride, lithium borohydride, diisobutylaluminum hydride, or a combination thereof. The reducing agent can include lithium aluminum hydride (LAH).

The reacting of the cleaned coal residue with the oxidizable inorganic metallic agent can be performed in a reactor. The reaction temperature of the reaction of the cleaned coal residue with the reducing agent can be at any suitable temperature, such as 0° C. to 50° C., or room temperature, or less than or equal to 50° C. but greater than or equal to 0° C., 5, 10, 15, 20, 25, 30, 35, 40, or 45° C. The reacting of the cleaned coal residue with the reducing agent can be conducted for any suitable duration, during which the reaction temperature is maintained, such as 1 min to 24 h, 10 min to 30 min, or at least 1 min, or less than or equal to 24 h but greater than or equal to 1 min, 2, 4, 6, 8, 10, 15, 20, 25, 30, 35, 40, 45, 50, 55 min, 1 h, 1.5, 2, 2.5, 3, 4, 5, 6, 8, 10, 12, 14, 16, 18, 20, or 22 h. The reacting of the cleaned coal residue with the reducing agent can be performed in a suitable solvent, such as an organic solvent, such as an ether (e.g., diethylether).

Reacting the cleaned coal residue with the reducing agent can further include working up the product of the reacting of the cleaned coal residue with the reducing agent, such as working up the product with water. The method can further include drying the cleaned coal residue after performing the reacting of the cleaned coal residue with the reducing agent, to remove water therefrom.

In some embodiments of the method, reacting of the cleaned coal residue with the oxidizable inorganic metallic agent is performed and the reacting of the cleaned coal residue with the reducing agent is not performed. In some embodiments, reacting of the cleaned coal residue with the reducing agent is performed and the reacting of the cleaned coal residue with the oxidizable inorganic metallic agent is not performed. In some embodiments, both the reacting of the cleaned coal residue with the oxidizable inorganic metallic agent is performed and the reacting of the cleaned coal residue with the reducing agent is performed, as sequential reactions. For example, the method can include first reacting the cleaned coal residue with the oxidizable inorganic metallic agent and then reacting the product thereof with the reducing agent. In another example, the method can include first reacting the cleaned coal residue with the reducing agent, and then reacting the product thereof with the oxidizable inorganic metallic agent. In embodiments that include both reactions in sequence, it is to be understood that for the second reaction, references herein to the starting material of the reaction being the cleaned coal residue can be replaced with the product of the prior reaction.

The upgraded coal can include any suitable ash content. Ash content can be determined via ASTM D7582. The upgraded coal can include an ash content of less than 5 wt %, or 0.5 to 2 wt %, or less than or equal to 5 wt % but greater than or equal to 0.1 wt %, 0.2, 0.3, 0.4, 0.5, 0.6, 0.7, 0.8, 0.9, 1, 1.2, 1.4, 1.6, 1.8, 2, 2.2, 2.4, 2.6, 2.8, 3, 3.5, 4, or 4.5 wt %. The upgraded coal can include an ash content that is lower than an ash content of the coal prior to the cleaning, such as 4 wt % to 15 wt % lower, or lower by less than or equal to 15 wt % but greater than or equal to 4 wt %, 5, 6, 7, 8, 9, 10, 11, 12, 13, or 14 wt %.

The upgraded coal can include any suitable oxygen content. The upgraded coal can include an oxygen concentration of 10 wt % to 25 wt %, or less than or equal to 25 wt % but greater than or equal to 10 wt %, 11, 12, 13, 14, 15, 16, 17, 18, 19, 20, 21, 22, 23, or 24 wt %. The upgraded coal can include an oxygen content that is lower than an oxygen content of the coal prior to the cleaning, such as 1% to 50% lower, 15% to 25% lower, 17% to 21% lower, or less than or equal to 50% lower but greater than or equal to 1% lower, 2, 3, 4, 5, 6, 8, 10, 11, 12, 13, 14, 15, 16, 17, 18, 19, 20, 21, 22, 23, 24, 25, 26, 28, 30, 35, 40, or 45% lower.

The upgraded coal can have any suitable carbon concentration. The upgraded coal can include a carbon concentration of 40 wt % to 75 wt %, or less than or equal to 75 wt % but greater than or equal to 40 wt %, 42, 44, 46, 48, 50, 52, 54, 56, 58, 60, 62, 64, 66, 68, 70, 72, or 74 wt %. The upgraded coal can include a higher carbon concentration than the coal prior to the cleaning, such as 1% to 30% higher, or 5% to 15% higher, or less than or equal to 30% higher but greater than or equal to 1% higher, 2, 3, 4, 5, 6, 7, 8, 9, 10, 11, 12, 13, 14, 15, 16, 17, 18, 19, 20, 22, 24, 26, or 28% higher.

The upgraded coal can have any suitable sulfur concentration. The upgraded coal can include a sulfur concentration of 0.1 wt % to 5 wt %, or 0.7 wt % to 1.05 wt %, or less than or equal to 5 wt % but greater than or equal to 0.1 wt %, 0.2, 0.4, 0.6, 0.7, 0.8, 0.85, 0.9, 0.95, 1, 1.05, 1.1, 1.15, 1.2, 1.25, 1.3, 1.35, 1.4, 1.45, 1.5, 1.6, 1.8, 2, 3, or wt %. The upgraded coal can include a lower sulfur concentration than the coal prior to the cleaning, such as 10% to 30% lower, or 15% to 25% lower, or less than or equal to 30% lower but greater than or equal to 10% lower, 11, 12, 13, 14, 15, 16, 17, 18, 19, 20, 21, 22, 23, 24, 25, 26, 27, 28, or 29% lower.

In various embodiments, the present invention provides an upgraded coal formed by an embodiment of the method.

The method can further include forming a graphene film from the upgraded coal. In various embodiments, the present invention provides a graphene film formed from an embodiment of the method.

The method can further include forming a graphene quantum dot from the upgraded coal. In various embodiments, the present invention provides a graphene quantum dot formed from an embodiment of the method.

Upgraded Coal.

In various aspects, the present invention provides an upgraded coal formed by the method of upgrading coal described herein. The upgraded coal can be any suitable upgraded coal formed by the method of upgrading coal described herein.

In various aspects, the present invention provides an upgraded coal including an ash content of less than 5 wt %, such as less than 4.5 wt %, 4, 3.5, 3, 2.5, 2, 1.5, 1, 0.5, or less than 0.1 wt %. The upgraded coal can have an oxygen concentration of 10 wt % to 25 wt %, such as less than or equal to 25 wt % but greater than or equal to 10 wt %, 11, 12, 13, 14, 15, 16, 17, 18, 19, 20, 21, 22, 23, or 24 wt %. The upgraded coal can have a carbon concentration of 40 wt % to 75 wt %, or less than or equal to 75 wt % but greater than or equal to 40 wt %, 42, 44, 46, 48, 50, 52, 54, 56, 58, 60, 62, 64, 66, 68, 70, 72, or 74 wt %.

The upgraded coal can have a lower ash content, as compared to the coal used to form the upgraded coal (e.g., naturally-sourced coal). The upgraded coal can have a lower oxygen concentration, as compared to the coal used to form the upgraded coal. The upgraded coal can have a high carbon concentration, as compared to the coal used to form the upgraded coal.

Graphene Film.

In various aspects, the present invention provides a graphene film formed from the upgraded coal and/or method of making the same described herein. The graphene film can be any suitable graphene film formed from the upgraded coal. The graphene film can be formed via any suitable method. In one embodiment, the graphene film can be formed by injecting upgraded coal particulate into a vacuum deposition chamber of a chemical vapor deposition system and thereby depositing the graphene film on a substrate within the chamber.

Graphene Quantum Dot.

In various aspects, the present invention provides a graphene quantum dot. The graphene quantum dot can be any suitable graphene quantum dot formed from the upgraded coal and/or method of making the same described herein. The graphene quantum dot can be formed via any suitable method, such as a solution-based method. For example, the graphene quantum dot can be formed by reacting the upgraded coal with acid under heating, followed by neutralization and filtration to remove impurities, and with optional precipitation to further remove impurities (e.g., salts) from the graphene quantum dot solution.

In various aspects, the present invention provides a graphene quantum dot including one or more fluorescence emission maxima at 395 nm excitation of 450 nm to 550 nm, or 490 nm to 520 nm, or less than or equal to 550 nm but greater than or equal to 450 nm, 452, 454, 456, 458, 460, 462, 464, 466, 468, 470, 472, 474, 476, 478, 480, 482, 484, 486, 488, 490, 491, 492, 493, 494, 495, 496, 497, 498, 499, 500, 501, 502, 503, 504, 505, 506, 507, 508, 509, 510, 511, 512, 513, 514, 515, 516, 518, 520, 522, 524, 526, 528, 530, 532, 534, 536, 538, 540, 542, 544, 546, or 548 nm.

EXAMPLES

Various embodiments of the present invention can be better understood by reference to the following Examples which are offered by way of illustration. The present invention is not limited to the Examples given herein. Concentrations given are in wt % unless indicated otherwise.

The coal samples were obtained from Center Mine, Freedom Mine, and Falkirk Mine in North Dakota, USA and crushed to ¼-inch-size particles and subjected to physical and chemical cleaning procedures. The coals were crushed to ¼-inch size particles and subsamples were analyzed to determine the coal properties by proximate analysis (ASTM D7582), ultimate analysis (ASTM D5373, D5016), heating value (ASTM D5865), and x-ray fluorescence (XRF) spectroscopy. The results presented in Table 1 are as expected for ND lignite.

TABLE 1

Proximate, ultimate, and XRF analysis of raw coals.

| Proximate Analysis | Prox-Ult-Btu Analysis | | | XRF Analysis | | | |
| --- | --- | --- | --- | --- | --- | --- | --- |
| | Center | Falkirk | Freedom | Component | Center | Falkirk | Freedom |
| Moisture | 21.51 | 32.74 | 32.69 | $SiO_2$ | 26.64 | 31.92 | 15.96 |
| Volatile Matter | 44.52 | 42.56 | 44.57 | $Al_2O_3$ | 13.37 | 11.29 | 11.07 |
| Fixed Carbon* | 47.42 | 46.63 | 49.27 | $Fe_2O_3$ | 11.44 | 7.76 | 5.42 |
| Ash | 8.06 | 10.81 | 6.16 | $TiO_2$ | 0.53 | 0.38 | 0.35 |
| Hydrogen | 4.31 | 4.29 | 4.58 | $P_2O_5$ | 0.09 | 0.08 | 0.34 |
| Carbon | 62.96 | 62.68 | 66.22 | $CaO$ | 16.82 | 22.16 | 30.14 |
| Nitrogen | 0.99 | 1.07 | 0.93 | $MgO$ | 6.20 | 6.06 | 7.84 |
| Sulfur | 1.10 | 0.81 | 0.89 | $Na_2O$ | 3.12 | 2.10 | 2.31 |
| Oxygen* | 22.57 | 20.34 | 21.21 | $K_2O$ | 0.90 | 1.28 | 0.25 |
| Heating Value | 10,387 | 10,431 | 11,176 | $SO_3$ | 20.36 | 15.96 | 25.20 |

*Calculated by difference.
Note: all concentrations in this table are in wt %, except the heating value that was measured in British Thermal Units (BTU).

Example 1. Preparation of Clean Coal Residue

The goal of cleaning the raw coal is to reduce the ash content so that the resultant product can be a better precursor for making graphene, other materials and/or utilized as feedstock to other processes. The cleaning process involved three steps presented below, together with the results obtained.

Step 1A. Physical cleaning. Physical cleaning was performed on Center Mine and Freedom Mine coals using the float-sink method in an aqueous solution of CsCl with varying specific gravities. The principle of physical cleaning is that inorganic minerals in coals that produce ash are heavier than coal and should sink in an aqueous salt solution with higher specific gravity than water. Thus, the float fraction at an optimal specific gravity is the clean fraction. Two specific gravities of CsCl solutions or 1.4 and 1.5 were investigated using the +20-mesh size fraction of the coals. The ash content of the physically cleaned residue was determined by ASTM D7582. The results presented in Table 2 show that better cleaning was achieved by a higher specific gravity solution of CsCl. However, the ash content of the "cleaned" coals were higher than those of the raw coals primarily because of the difficulty of removing residual Cs from the clean coal residue. Thus, the resulting residue was subjected to a further cleaning step with mineral acid.

TABLE 2

Ash content of raw and physically cleaned coals.

| Coal Source | Specific Gravity | Raw Coal Ash, wt % | Cleaned Coal Ash, wt % | % Reduction |
| --- | --- | --- | --- | --- |
| Freedom Mine (+20 mesh, float) | 1.4 | 7 | 9 | −40 |
| Freedom Mine (+20 mesh, sink) | 1.4 | 7 | 17 | −159 |
| Freedom Mine (+20 mesh, float) | 1.5 | 7 | 13 | −92 |
| Freedom Mine (+20 mesh, sink) | 1.5 | 7 | 28 | −320 |
| Center Mine (+20 mesh, float) | 1.4 | 9 | 7 | 23 |
| Center Mine (+20 mesh, sink) | 1.4 | 9 | 19 | −103 |
| Center Mine (+20 mesh, float) | 1.5 | 9 | 13 | −43 |

TABLE 2-continued

Ash content of raw and physically cleaned coals.

| Coal Source | Specific Gravity | Raw Coal Ash, wt % | Cleaned Coal Ash, wt % | % Reduction |
| --- | --- | --- | --- | --- |
| Center Mine (+20 mesh, sink) | 1.5 | 9 | 64 | −605 |

Step 1B. Chemical cleaning after physical cleaning. The +20-mesh float fraction of Center Mine and Freedom Mine lignite after physical cleaning were subjected to chemical cleaning using nitric and hydrochloric acids. DI water was used as the control, while 1.4 M and 1.5 M concentrations of $HNO_3$ and HCl were tested to determine their performance, using a 3:1 ratio of acid to coal (volume:weight). The acid cleaned residues were analyzed to determine the ash content. The results presented in Table 3 indicate that physical cleaning, followed by chemical cleaning yielded percent reductions of 79% to 85%, with actual residual ash in the cleaned product of 1-2 wt %. This residual ash content is well below the 5-wt % target set at the beginning of the project.

TABLE 3

Ash content of coals before and after physical and chemical cleaning.

| Coal Source | Solvent (conc.) | Raw Coal Ash, wt % | Cleaned Coal Ash, wt % | % Reduction |
|---|---|---|---|---|
| Freedom Mine | DI water | 6.62 | 10.10* | −52.56 |
| Freedom Mine | $HNO_3$ (1.5M) | 6.62 | 1.01 | 84.74 |
| Freedom Mine | HCl (1.5M) | 6.62 | 1.32 | 80.09 |
| Center Mine | DI water | 9.12 | 7.38 | 19.11 |
| Center Mine | $HNO_3$ (1.5M) | 9.12 | 1.95 | 78.60 |
| Center Mine | HCl (1.5M) | 9.12 | 1.53 | 83.23 |

*Low loss on injection (LOI) determination impacted the results.

Step 2. Chemical cleaning only. A chemical cleaning only step was investigated to evaluate the possibility to use only chemical acids for the cleaning without an initial physical cleaning step to avoid unnecessary steps, which enhances the process economic feasibility. The chemical cleaning step involved using mineral acids such as hydrochloric acid to clean the +20-mesh coal samples. For comparison, a −200-mesh particle-size sample of Falkirk lignite was also cleaned to determine any potential particle-size effects on the cleaning process. The ash content of the cleaned residues was determined by proximate analysis (ASTM D7582). The results shown in Table 4 indicate percent ash reductions in the range 43% to 66%, with no major particle-size effects observed in the Falkirk coal results. While these results are good, they represent a slightly lower ash reduction performance by only conducting chemical cleaning compared to physical and chemical cleaning combined (see Table 4).

TABLE 4

Ash content of raw coal and product from chemical fractionation cleaning.

| Coal Mine | Raw Coal Ash, wt % | Acid Cleaned Ash, % | % Reduction |
|---|---|---|---|
| Freedom | 6.16 | 2.08 | 66 |
| Center | 8.06 | 4.08 | 49 |
| Falkirk | 10.81 | 5.83 | 46 |
| Falkirk, −200 mesh | 10.81 | 6.19 | 43 |

Example 2. Reacting Clean Coal Residue with Oxidizable Inorganic Metallic Agent

The clean coal residue obtained by acid cleaning of the raw coal was treated in an autoclave reactor, with the aim to reduce the content of heteroatoms such as oxygen or sulfur. Heteroatoms, particularly oxygen, can promote cross-linking reactions that produce isotropic char during heat treatment in the production of synthetic graphite. Cross-linking reduces the quality (low crystallinity) of the resulting graphitic material, thus, rendering it unsuitable for making graphene or for other applications that require high quality graphite. The autoclave reactor used in these experiments is rated at maximum temperature and pressure limits of 600° C. and about 5000 psi, respectively. A schematic of the autoclave reactor system 10 is shown in FIG. 1, which includes reactor vessel 40, reactor lid and stirrer assembly 20, and stirring motor 30.

The coal sample was prepared as a slurry of the coal in an aqueous solution of the oxidizable inorganic metallic agent. Center lignite was reacted with an aqueous solution of hydrated ferrous chloride, while Falkirk and Freedom lignite were reacted with an aqueous solution of hydrated ferrous sulfate. The coal slurry sample was placed in the autoclave reactor sleeve, and the system was sealed off. The reactor was evacuated to about −28 inHg vacuum to remove any trapped air/oxygen and then backfilled and flushed with argon. After five cycles of evacuation, backfilling and flushing, the system was placed at atmospheric pressure using argon. The reactor was heated to the target temperature of 300° C. (572° F.). The target temperature was maintained for about 1 hr 30 min, and then the heaters were turned off to allow gradual cooling to room temperature overnight. Ideally, the reactor is cooled rapidly to room temperature to quench the reaction by installing cooling coils in the autoclave reactor. The coal residue was recovered and rinsed three times with DI water or until a clear solution filtrate was obtained. The filtered residue was placed in aluminum trays and dried in an oven at 70° C. for 24 hrs and then stored in an air-tight container.

Samples of the vapors generated during reaction in the autoclave were collected using chromatographic gas bags, which were subsequently analyzed by gas chromatography (GC). The results are presented in Table 5 and include all gas components with available calibrations. The results show that a significant fraction of the gases evolved was $CO_2$ for all three coals. Alongside $CO_2$ were $H_2$, CO, $N_2$, and $H_2S$, with small detections of light hydrocarbons (C1-C5) at less than 0.1%, except for methane that was detected at 0.4%, 0.8%, and 1.8% for Center lignite, Falkirk lignite, and Freedom lignite, respectively. The closures for the gas analyses were 99.5%, 105.6%, and 110.6% for Center, Falkirk, and Freedom lignite, respectively. These closures indicate that the amount of undetected species (due to no calibration standard) was about 10% or less, which suggest that the results in Table 5 give a good representation of the major components of the gas stream evolved during autoclave coal reactions for each lignite. The results further indicate that loss of oxygen and sulfur likely occur as $CO_2$, CO, and $H_2S$.

TABLE 5

Composition of Gases Evolved During Autoclave Reactions in mol %.

| Component | Center | Falkirk | Freedom |
|---|---|---|---|
| Hydrogen | 7.208 | 2.254 | 6.554 |
| Hydrogen Sulfide | 0.426 | 1.882 | 0.000 |
| Carbon Dioxide | 83.051 | 91.383 | 84.375 |
| Carbon Monoxide | 2.096 | 1.079 | 1.541 |
| Nitrogen | 6.429 | 2.153 | 4.888 |
| Methane | 0.411 | 0.783 | 1.826 |
| Ethane | 0.060 | 0.092 | 0.258 |
| Ethylene | 0.082 | 0.089 | 0.119 |
| Propane | 0.059 | 0.086 | 0.156 |
| Propylene | 0.095 | 0.102 | 0.129 |
| n-Butane | 0.005 | 0.010 | 0.025 |
| Iso-Butane | 0.009 | 0.011 | 0.021 |
| 1-Butene | 0.012 | 0.010 | 0.016 |
| Iso-Butylene | 0.041 | 0.052 | 0.064 |
| trans-2-Butene | 0.006 | 0.005 | 0.007 |
| cis-2-Butene | 0.008 | 0.007 | 0.010 |
| n-Pentane | 0.003 | 0.004 | 0.009 |

The results of proximate and ultimate analyses of the autoclave-reacted coal residues are presented in Table 6 together with the raw coal analysis for comparison. The proximate analysis data indicate that the volatile matter (VM) in the coals reduced by 13%-19%, with a corresponding increase in fixed carbon (FC) by 16%-19%. Ultimate analysis results show a 17%-21% reduction in oxygen, 9%-10% increase in Btu, 8%-10% decrease in $H_2$, and 9%-11% increase in carbon, which corroborate the reduced VM and increased FC observed in proximate analysis. There is a small sulfur reduction of 4% for reacted Center lignite, but a 13% and 29% increase in sulfur for Freedom and Falkirk lignite, respectively. The observed differences in sulfur contents is attributed to the use of ferrous sulfate for treating Falkirk and Freedom lignite as opposed to ferrous chloride used for Center lignite. Because the chemical reagent used in these tests was primarily aimed at reducing the oxygen content in the coals, the reduction of sulfur by 4% in Center lignite provides additional benefit and ability to reduce the heteroatom content of coals. The decrease in VM, increase in FC, and reduction in oxygen content of the reacted coals relative to the raw coals are all good characteristics that enable the reacted coals to be better graphene precursors.

TABLE 6

Proximate and Ultimate Analysis of the Raw and Autoclave-Reacted Coals.

| Proximate Analysis | Before Autoclave Reaction | | | After Autoclave Reaction | | | % Change ** | | |
|---|---|---|---|---|---|---|---|---|---|
| | Center | Falkirk | Freedom | Center | Falkirk | Freedom | Center | Falkirk | Freedom |
| Moisture | 21.51 | 32.74 | 32.69 | 1.94 | 18.35 | 1.39 | | | |
| Volatile Matter | 44.52 | 42.56 | 44.57 | 36.05 | 36.69 | 38.70 | −19 | −14 | −13 |
| Fixed Carbon* | 47.42 | 46.63 | 49.27 | 56.55 | 54.29 | 58.42 | 19 | 16 | 19 |
| Ultimate Analysis | | | | | | | | | |
| Hydrogen | 4.31 | 4.29 | 4.58 | 3.90 | 3.95 | 4.23 | −10 | −8 | −8 |
| Carbon | 62.96 | 62.68 | 66.22 | 68.65 | 68.54 | 73.39 | 9 | 9 | 11 |
| Nitrogen | 0.99 | 1.07 | 0.93 | 1.08 | 1.09 | 0.94 | 9 | 2 | 1 |
| Sulfur | 1.10 | 0.81 | 0.89 | 1.06 | 1.05 | 1.00 | −4 | 29 | 13 |
| Oxygen* | 22.57 | 20.34 | 21.21 | 17.91 | 16.35 | 17.55 | −21 | −20 | −17 |
| Btu | 10387 | 10431 | 11176 | 11425 | 11394 | 12242 | 10 | 9 | 10 |

*Calculated by difference.
**Positive value means increase in parameter, and negative value means a decrease in parameter.

The XRF analysis results of the autoclave-reacted coals, including data for the raw coals for comparison, are presented in Table 7. The results show an increase in some of the components and a decrease in others; these findings are consistent with the nature of the reactions. Sulfur represented in oxide form shows a significant reduction, which is different from what was observed in ultimate analysis and can be attributed to differences in the analytical techniques.

TABLE 7

XRF Analysis of Raw and Autoclave-Reacted Coals.

| Component | Before Autoclave Reaction | | | After Autoclave Reaction | | | % Change* | | |
|---|---|---|---|---|---|---|---|---|---|
| | Center | Falkirk | Freedom | Center | Falkirk | Freedom | Center | Falkirk | Freedom |
| $SiO_2$ | 26.64 | 31.92 | 15.96 | 48.96 | 47.17 | 63.24 | 84 | 48 | 296 |
| $Al_2O_3$ | 13.37 | 11.29 | 11.07 | 14.32 | 15.42 | 16.61 | 7 | 37 | 50 |
| $Fe_2O_3$ | 11.44 | 7.76 | 5.42 | 32.76 | 34.50 | 13.52 | 186 | 344 | 149 |
| $TiO_2$ | 0.53 | 0.38 | 0.35 | 0.86 | 1.30 | 0.75 | 61 | 239 | 112 |
| $P_2O_5$ | 0.09 | 0.08 | 0.34 | 0.03 | 0.04 | 0.02 | −62 | −50 | −93 |
| CaO | 16.82 | 22.16 | 30.14 | 0.01 | 0.09 | 0.07 | −100 | −100 | −100 |
| MgO | 6.20 | 6.06 | 7.84 | 0.71 | 0.24 | 0.69 | −88 | −96 | −91 |
| $Na_2O$ | 3.12 | 2.10 | 2.31 | 0.28 | 0.18 | 0.47 | −91 | −91 | −80 |
| $K_2O$ | 0.90 | 1.28 | 0.25 | 1.30 | 0.21 | 2.42 | 45 | −84 | 867 |
| $SO_3$ | 20.36 | 15.96 | 25.20 | 0.23 | 0.37 | 0.71 | −99 | −98 | −97 |

*Positive value means increase in parameter and negative value means decrease in parameter.

Example 3. Reacting the Coal Residue with a Reducing Agent

The residue obtained from the acid cleaning process or from the autoclave experiments was treated with lithium aluminum tetrahydride (LAH) primarily to reduce multiple bonds of oxygen functional groups such as carbonyl or carboxylic acid or multiple bonds in any nitrogen functional groups. The LAH experiments were conducted on separate portions of the coal residue obtained from the acid cleaning step or from the autoclave reaction. In each experiment, 20 g of coal residue was mixed with 50 mL of LAH solution in diethylether (DEE) and stirred for 20 minutes. DI water was used for reaction work-up. The resultant mixture was rinsed several times with additional DI water until a clear filtrate solution was obtained. The final residue was dried in an oven at 70° C. overnight and then stored in air-tight containers prior to analysis.

Elemental analysis results shown in Table 8 indicate a reduction in sulfur content by 24 wt % and 22 wt % for Center lignite and Freedom lignite, respectively. The nitrogen content was reduced by 15 wt % (Center coal) and 5 wt % (Freedom coal), while the oxygen content increased by 19 wt % for Center coal and 21 wt % for Freedom coal. The increase in oxygen, rather than a decrease, is because of residual oxygen content in the leftover LAH products of the reactions. Since the ultimate analysis determines oxygen content by difference, it is impossible to distinguish oxygen present in LAH products versus oxygen in coal residue. As discussed later in the FTIR analysis section, the LAH reactions were successful in reducing the C=O multiple bond groups to alcohols, as well as demonstrate efficacy in reducing the heteroatom content. Removal of the LAH reaction byproducts would further improve the quality of the residue as a graphene precursor or for other applications.

TABLE 8

Proximate and Ultimate Analysis of Coals Before and after LAH Reactions.

| Proximate Analysis | Before LAH Reaction | | After LAH Reaction | | % Change, moisture-free | |
|---|---|---|---|---|---|---|
| | Center | Freedom | Center | Freedom | Center | Freedom |
| Moisture | 1.94 | 1.39 | 1.47 | 1.31 | N/A | N/A |
| Volatile Matter | 36.05 | 38.70 | 39.03 | 39.97 | 8 | 3 |
| Fixed Carbon* | 56.55 | 58.42 | 40.39 | 44.21 | −29 | −24 |
| Ash | 7.40 | 2.88 | 20.58 | 15.82 | 178 | 449 |
| Ultimate Analysis | | | | | | |
| Hydrogen | 3.90 | 4.23 | 3.72 | 3.97 | −5 | −6 |
| Carbon | 68.65 | 73.39 | 52.62 | 57.39 | −23 | −22 |
| Nitrogen | 1.08 | 0.94 | 0.91 | 0.89 | −15 | −5 |
| Sulfur | 1.06 | 1.00 | 0.80 | 0.78 | −24 | −22 |
| Oxygen* | 17.91 | 17.55 | 21.36 | 21.15 | 19 | 21 |

*Calculated by difference.

Example 4. Fourier Transform Infrared (FTIR) Spectroscopy Characterization of ND Lignite Coals and Upgraded Residues FTIR spectroscopy is an effective, quick, nondestructive technique for obtaining chemical information from a sample, especially regarding the different organic functional groups. An attenuated total reflection (ATR) FTIR spectrometer was used for these analyses. In each case, a finely ground powder sample sieved through a −325 mesh (≤44 μm) was used for the analysis.

Figure 2:
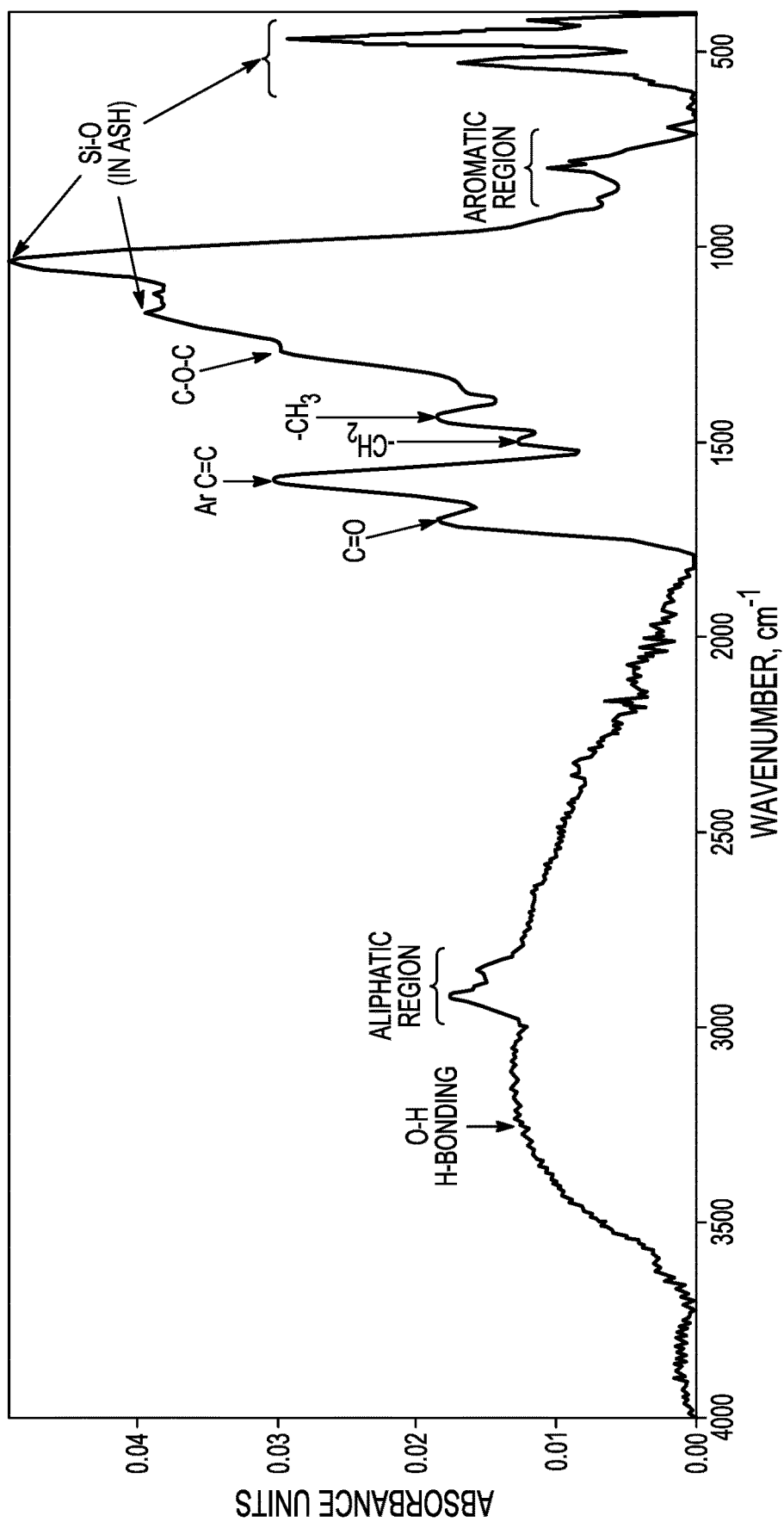
FIG. 2. FTIR band assignments for North Dakota lignite, in accordance with various embodiments.

FIG. 2 shows an example of an FTIR spectrum obtained from a ND lignite sample. The various functional groups are marked on the spectrum and the specific absorption band assignments are as follows. The broad hump from around 3050-3750 $cm^{-1}$ is assigned to the hydrogen bonding (H-bonding) in the coal from carboxylic acids and alcohols. The peaks at 2853 $cm^{-1}$ and 2924 $cm^{-1}$ are the symmetric $CH_3$ and asymmetric $CH_2$ groups in the aliphatic chains. The carbonyl group bands occur at 1700 $cm^{-1}$ and the aromatic C=C bond stretch occurs at around 1598 $cm^{-1}$. The peaks at about 1501 $cm^{-1}$ and 1439 are due to $CH_2$ and $CH_3$ deformations, respectively. The broad, shoulder peak at 1262 $cm^{-1}$ is assigned to the ether functional group, while the peaks around 1169 $cm^{-1}$ and 1039 $cm^{-1}$ as well as 530 $cm^{-1}$, 424 $cm^{-1}$, and 468 $cm^{-1}$ are attributed to $SiO_2$ in the ash. The aromatic ring bands occur in the region from 700 to 900 $cm^1$, with the center location marked in the spectrum at about 798 $cm^{-1}$.

Figure 3:
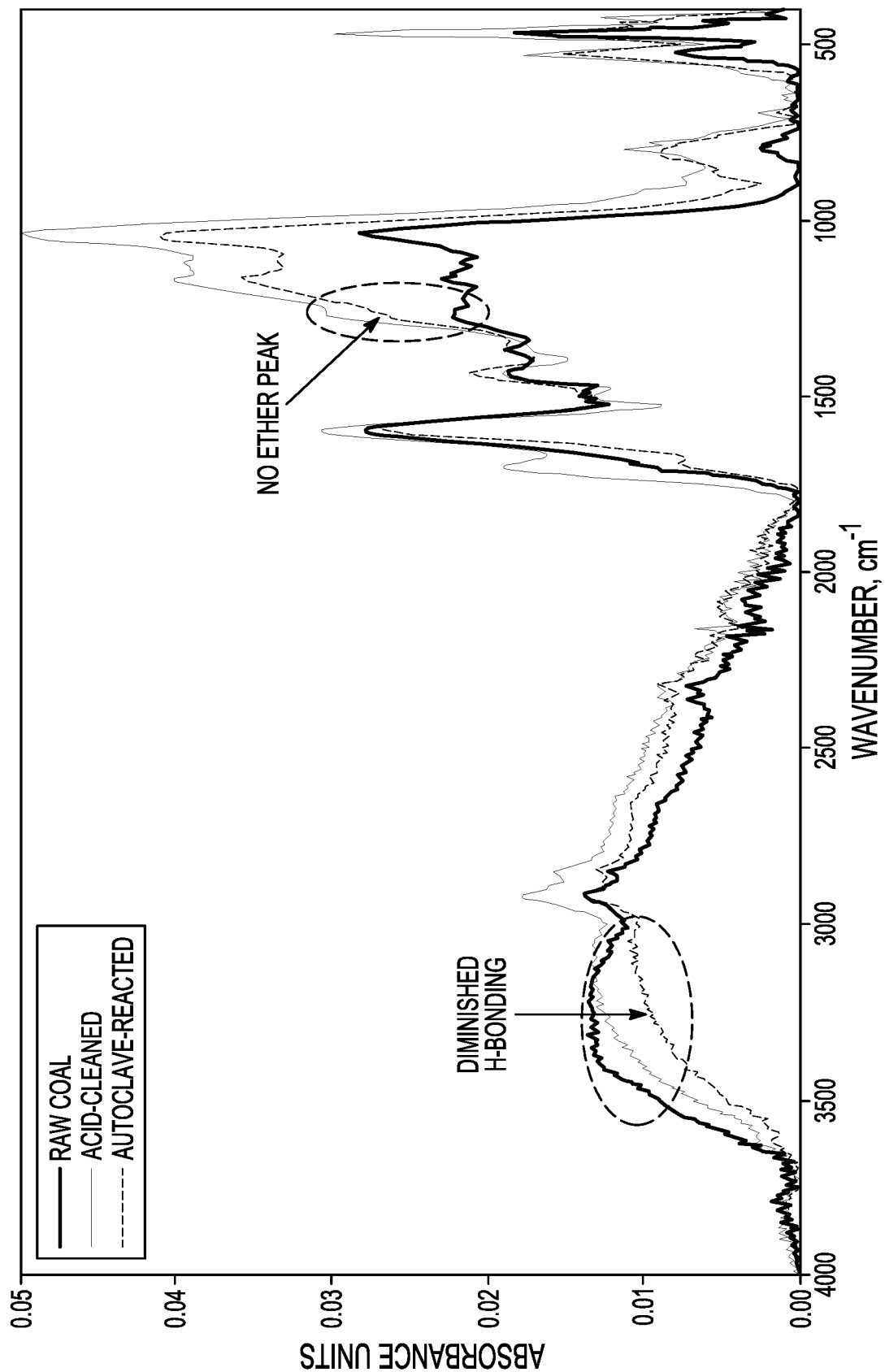
FIG. 3 illustrates an FTIR spectrum of Center Mine lignite for raw, acid cleaned, and autoclave reacted samples, in accordance with various embodiments.
Figure 4:
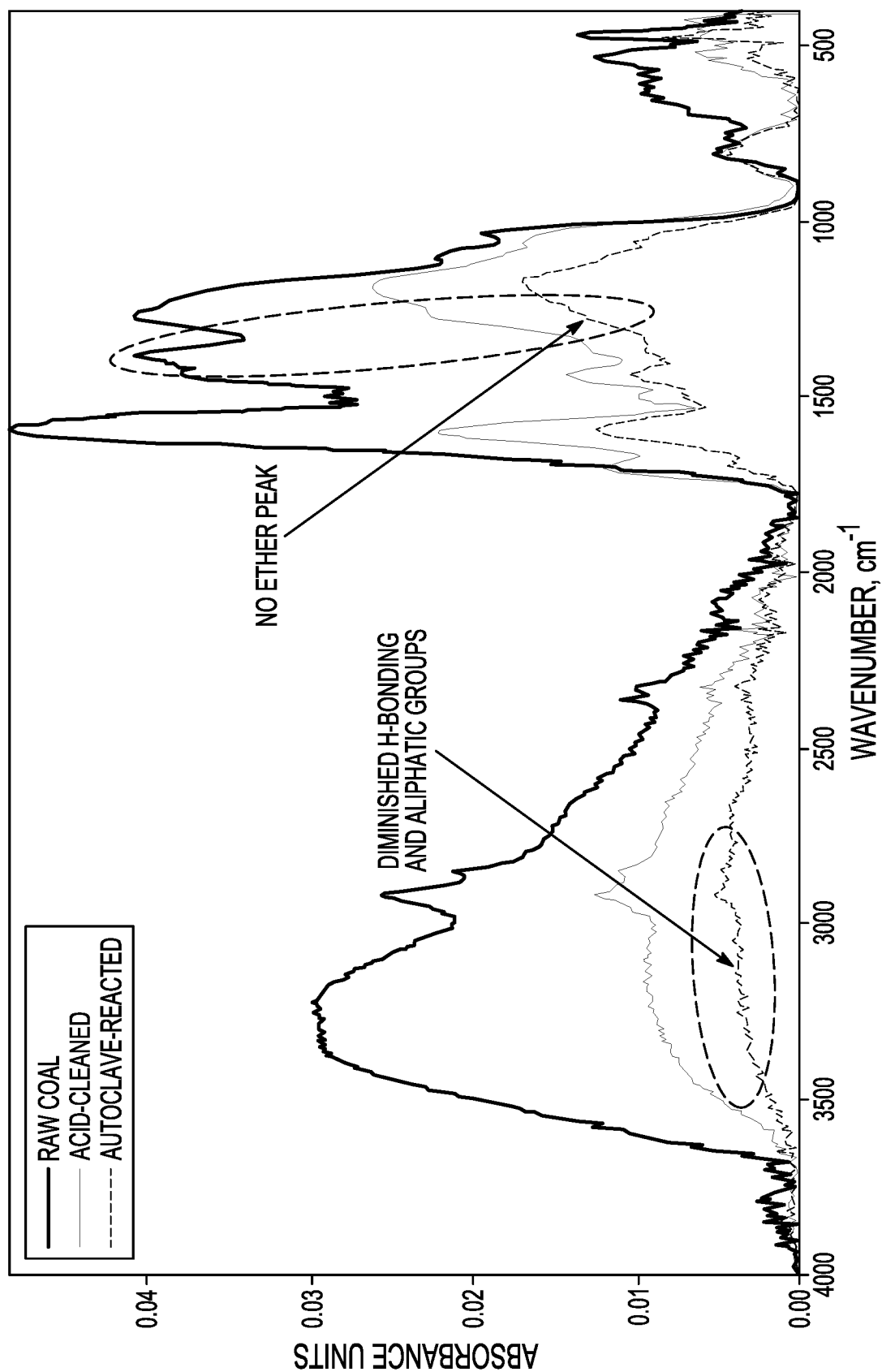
FIG. 4 illustrates an FTIR spectrum of Freedom Mine lignite for raw, acid cleaned, and autoclave reacted samples, in accordance with various embodiments.
Figure 5:
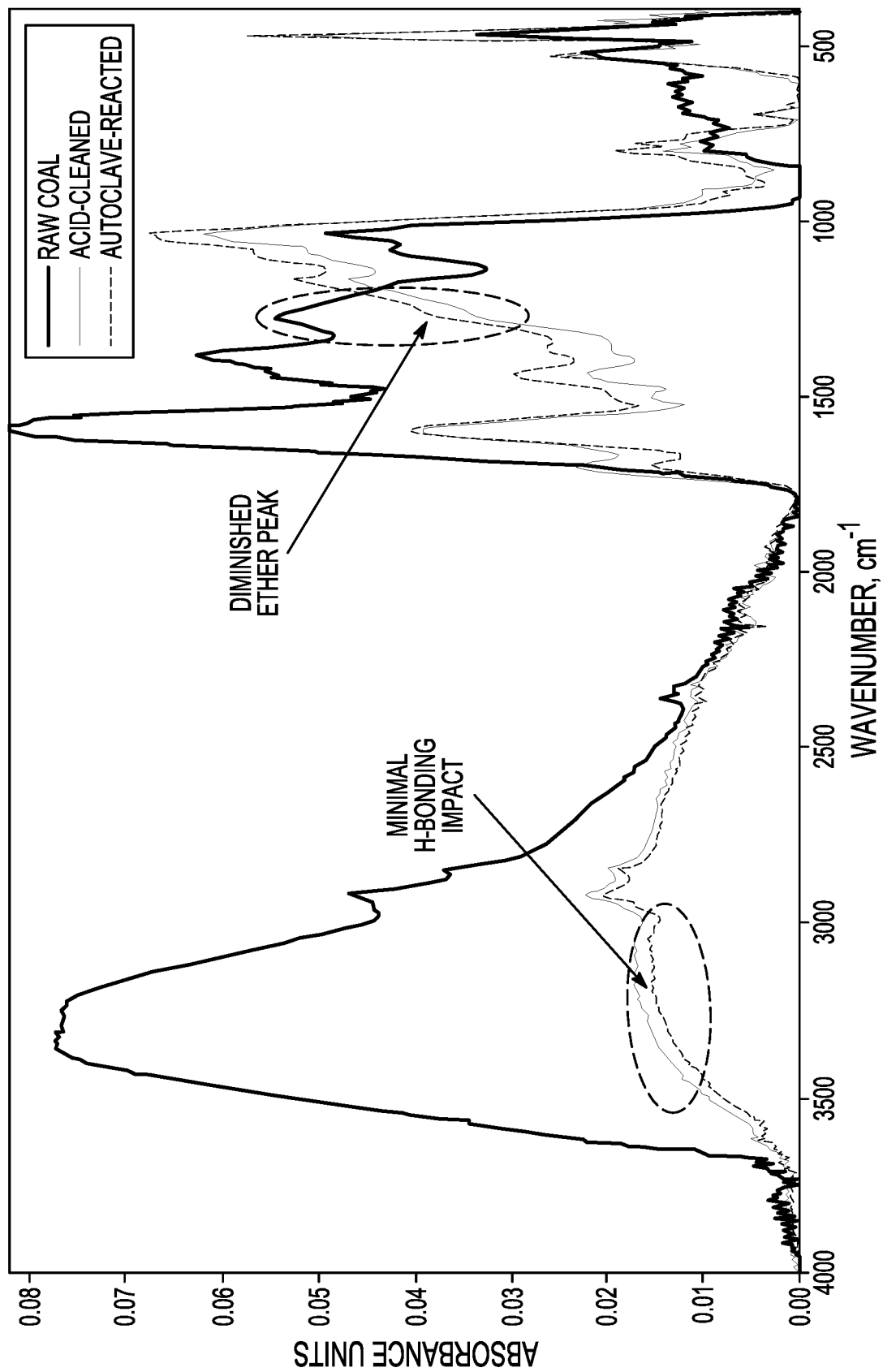
FIG. 5 illustrates an FTIR spectrum of Falkirk Mine lignite for raw, acid cleaned, and autoclave reacted samples, in accordance with various embodiments.

FIG. 3 shows the FTIR spectrum of Center Mine lignite for raw, acid cleaned, and autoclave reacted samples to demonstrate the effectiveness of the autoclave reactions. The goal of this reaction was to reduce the oxygen content in coals, thus, enhancing the graphitizability of the coal and improving its quality as a better graphene precursor. The raw (black) and acid cleaned (red) spectra clearly show the ether functional groups present, but the autoclave-reacted residue shows no ether. This suggests that the oxygen associated with the ether groups was removed; this finding is consistent with the observed oxygen reductions in the elemental analysis of the autoclave-reacted coal residues. The extent of H-bonding is also diminished as a result of the autoclave reactions, but the carbonyl groups around 1698 $cm^{-1}$ are unaffected. The aromatic content of the coals appears to be enhanced, as observed by the higher intensities of the aromatic peaks in the region 700-900 $cm^{-1}$. Similar observations were made for Freedom Mine and Falkirk Mine coals as displayed in FIGS. 4 and 5. However, the ether groups in the Falkirk coal were not completely removed as a result of challenges during the autoclave reactions, which suggest the optimal conditions were not met. In addition, the content of the aliphatic groups in Freedom coal was also diminished.

Figure 6:
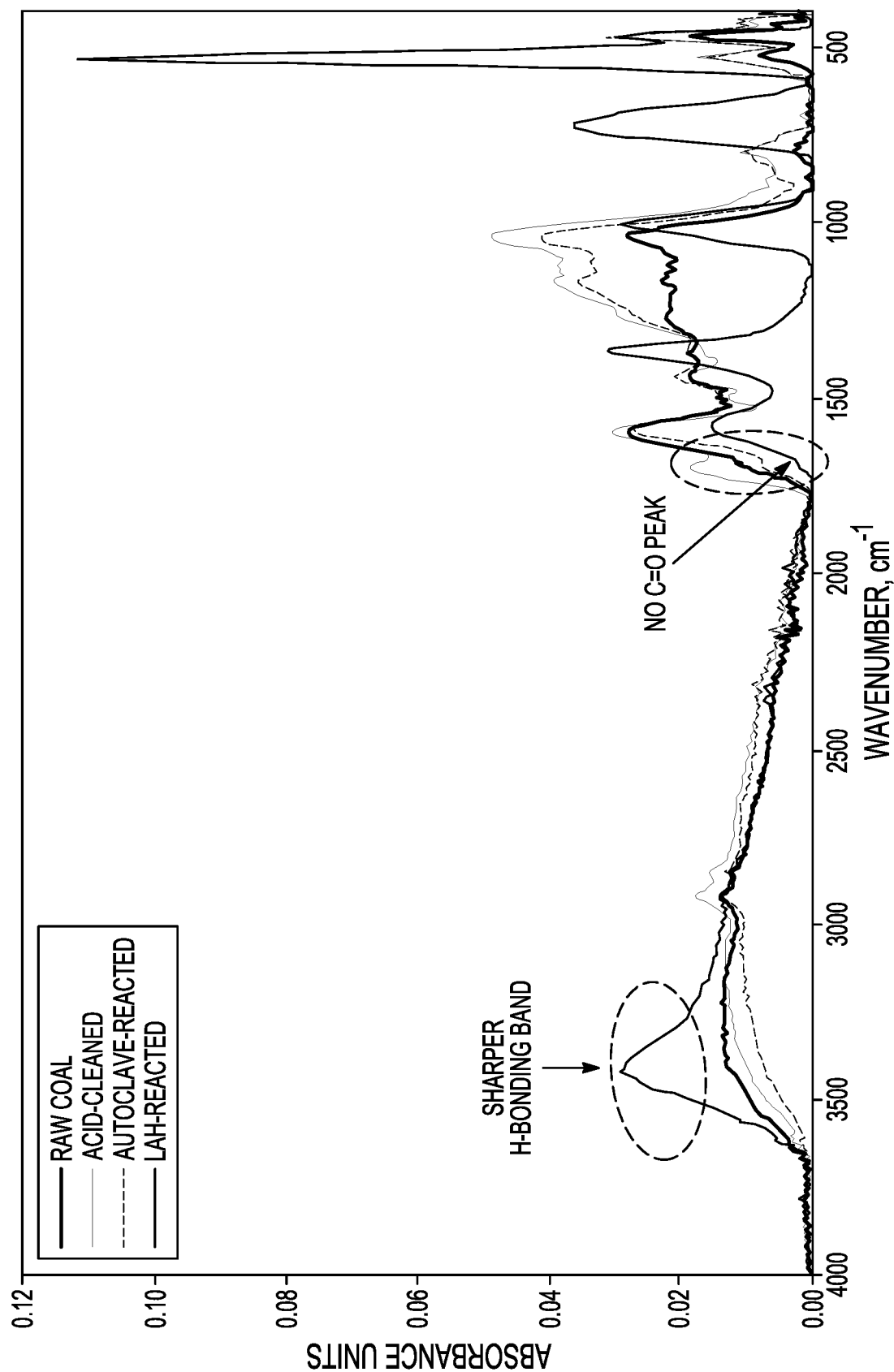
FIG. 6 illustrates an FTIR spectra for Center Mine lignite spectra for raw, acid-cleaned, autoclave-reacted, and LAH-reacted coal residues, in accordance with various embodiments.
Figure 7:
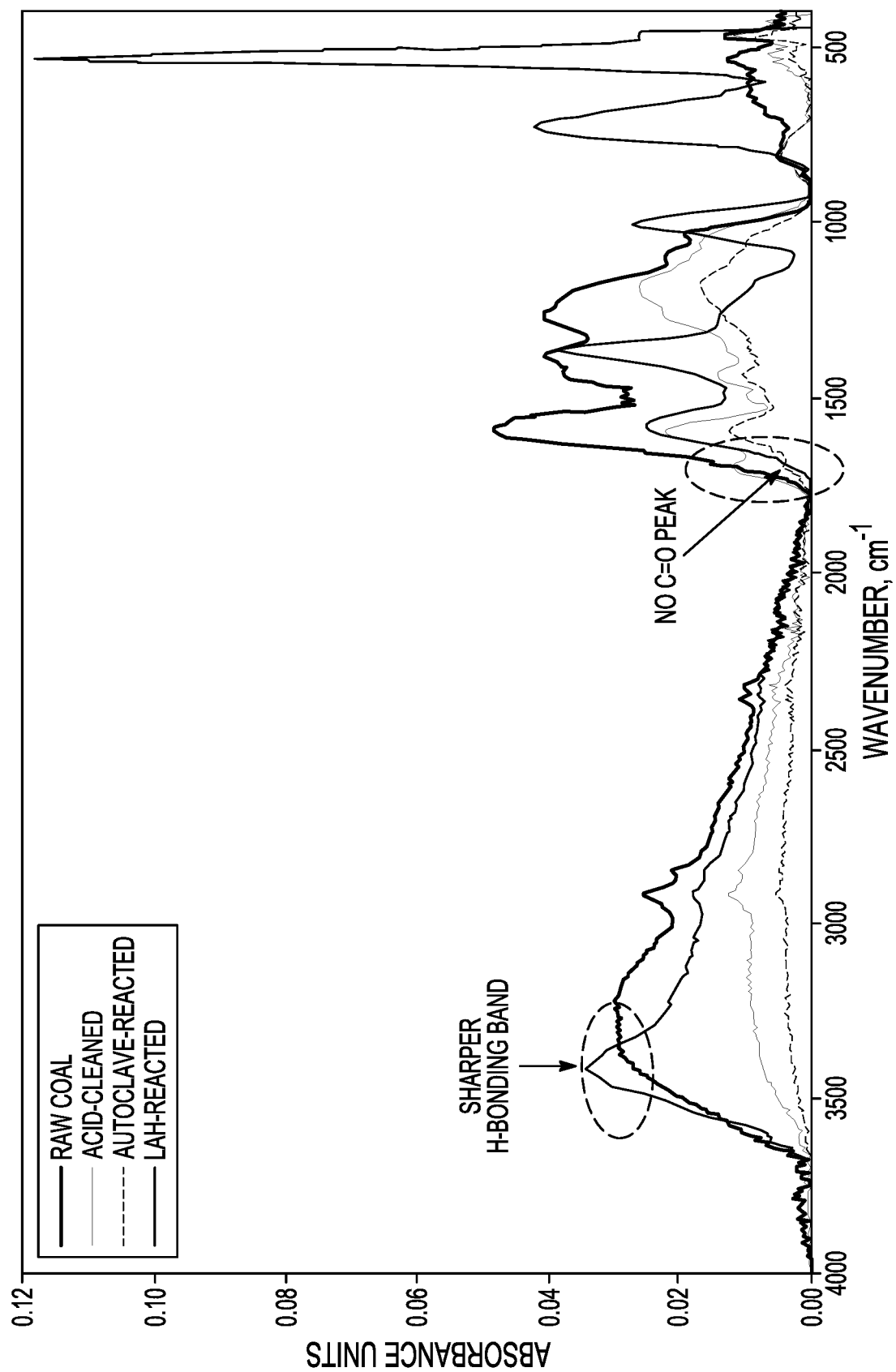
FIG. 7 illustrates an FTIR spectra for Freedom Mine lignite spectra for raw, acid-cleaned, autoclave-reacted, and LAH-reacted coal residues, in accordance with various embodiments.

To demonstrate the effectiveness of the LAH reaction and its ability to reduce C=O multiple bonds in the coals to their corresponding single bonds as in alcohols, this reaction was carried out on Center Mine and Freedom lignite autoclave-reacted residues. In FIGS. 6 and 7, the spectra for raw, acid-cleaned, autoclave-reacted, and LAH-reacted coal residues are displayed for Center Mine coal and Freedom Mine coal, respectively. In both cases, the absence of the C=O peak in the LAH-reacted residue is an indication of effective reduction of carbonyl groups in the coals. Additionally, the broad hump in the 3050-3750 $cm^{-1}$ region becomes sharper compared to the raw coal, acid-cleaned, and autoclave-reacted residues. This observation further suggests that the carbonyl in the carboxylic acid groups was also reduced to alcohols. Carboxylic acid groups often exhibit electron delocalization which could cause broader FTIR peaks, but alcohols do not experience this electron phenomenon and so exhibit sharper H-bonding bands than the carboxylic acid bands.

Example 6. Making Graphene Quantum Dots from Upgraded Coal Product

In a typical preparation of graphene quantum dots (GQDs), 300 mg of upgraded coal residue was mixed with 80 mL of $HNO_3$ and $H_2SO_4$. The acid mixture was made in the ratio of 1:3 nitric acid to sulfuric acid in aqueous solutions. The coal/acid mixture was sonicated for 2 hr in an Erlenmeyer flask and then subsequently heated at ~70° C. with gentle stirring for about 24 hr. The resultant solution was cooled to room temperature and poured onto five cubes of house whole ice. The solution was brought to pH 7 by adding 3 M NaOH solution. The neutral solution was filtered using a 0.45-μm polytetrafluoroethylene (PTFE) filter and placed in a refrigerator at 45° F. for 1 week to precipitate out most of the salts as a purification step. For enhanced purification, the solution of GQDs would be subjected to ultrafiltration or dialysis.

Figure 8A:
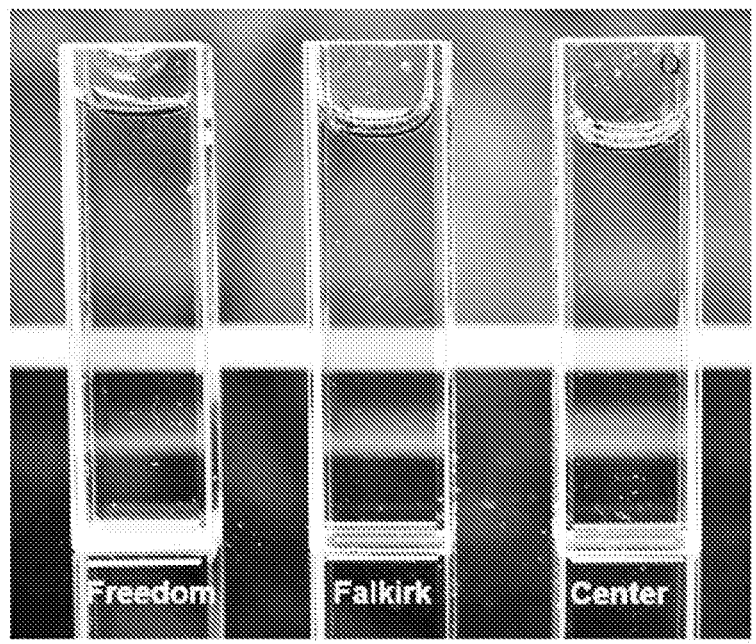
FIG. 8A illustrates a photograph of various ND lignite-derived graphene quantum dot (GQD) solutions under white light, in accordance with various embodiments.
Figure 8B:
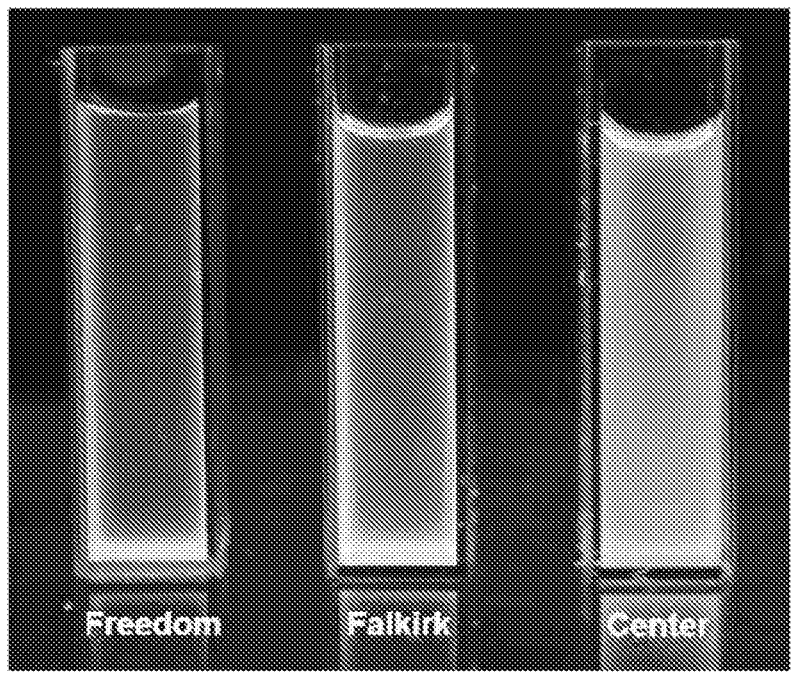
FIG. 8B illustrates a photograph of various ND lignite-derived GQD solutions under UV fluorescence, in accordance with various embodiments.
Figure 9:
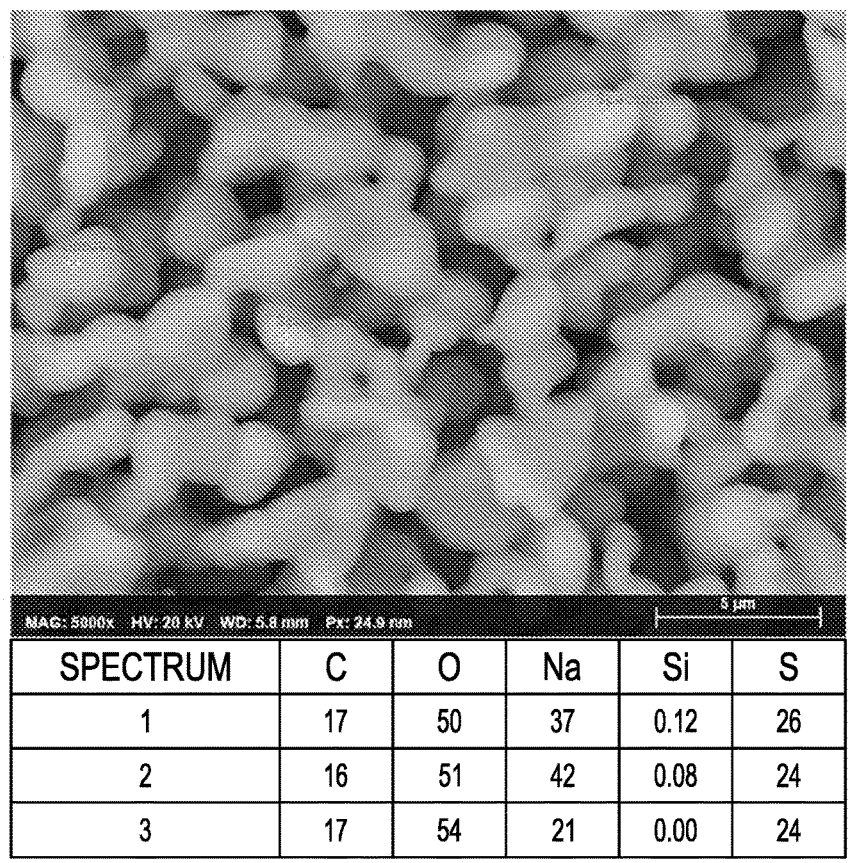
FIG. 9 illustrates a field-emission scanning electron microscopy (FESEM) photomicrograph of salts from GQD solution, in accordance with various embodiments.

The GQDs were characterized in solution by UV-vis and UV fluorescence spectroscopy techniques. FIGS. 8A-B show images of the GQDs under white light (8A) and UV fluorescence (8B) produced by the samples following exposure to UV radiation. The salts precipitated from the GQD solutions during purification were analyzed by field-emission scanning electron microscopy (FESEM) and found to be dominantly sodium sulfate (FIG. 9), which is consistent with the types of chemicals used in the preparation (i.e., NaOH, $HNO_3$, and $H_2SO_4$).

Figure 10:
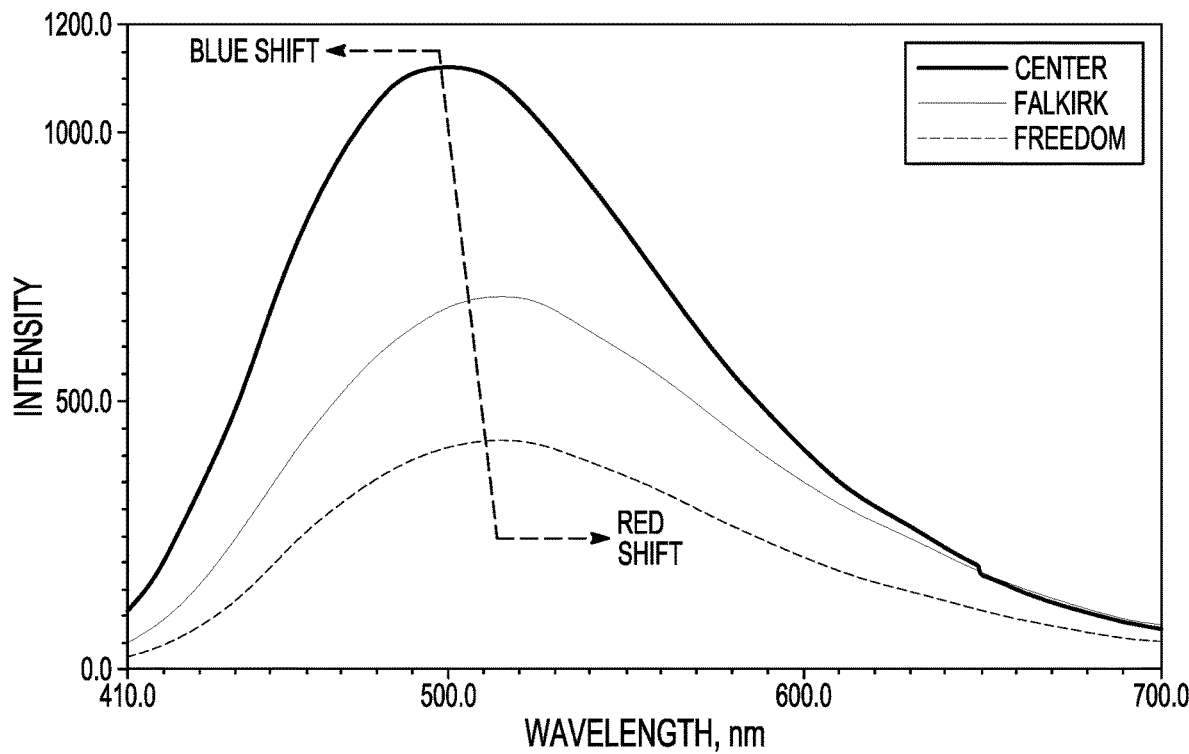
FIG. 10 illustrates emission spectra of Center, Falkirk, and Freedom lignite GQDs, in accordance with various embodiments.
Figure 11:
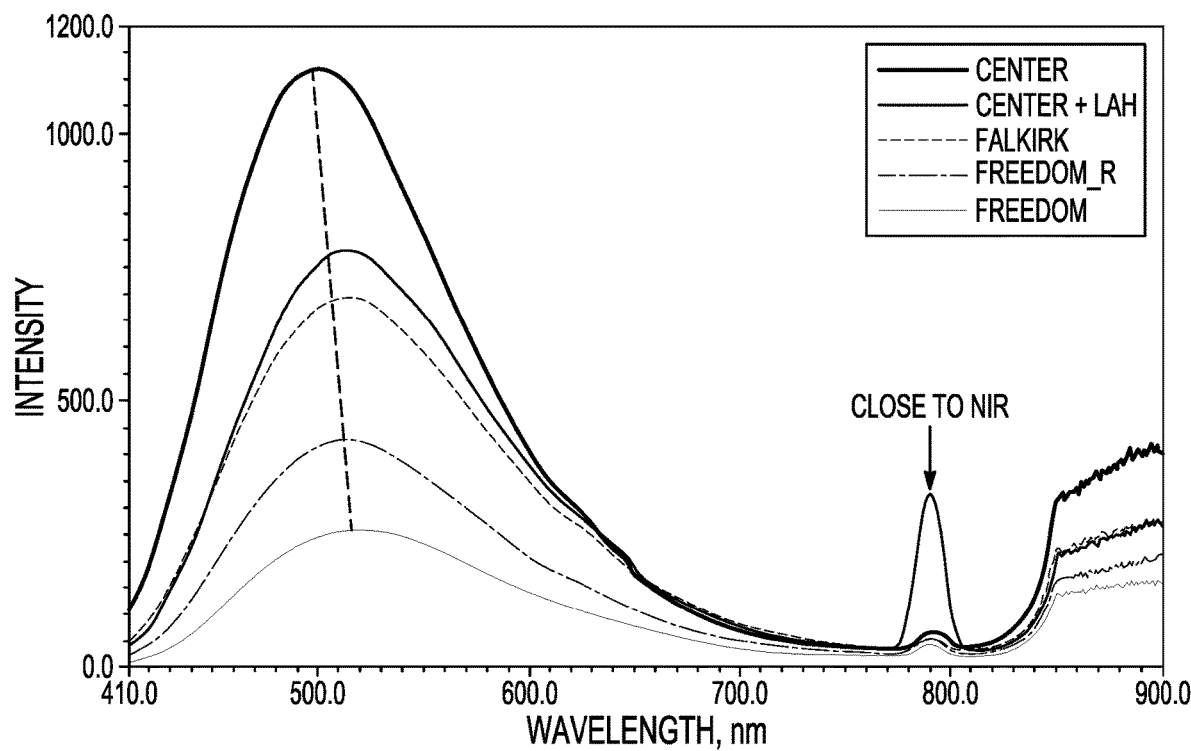
FIG. 11 illustrates emission spectra of Center, Falkirk, and Freedom lignite-derived GQDs, in accordance with various embodiments.

The fluorescence emission spectra displayed in FIG. 10 were obtained at 395-nm excitation and the emission maxima occur at 498 nm, 515 nm, and 513 nm for the GQDs derived from Center, Freedom, and Falkirk lignite, respectively. The spectra displayed in FIG. 11 show emission maxima at 498 nm and 512 nm for GQDs from Center acid-cleaned coal (Center) and Center coal that underwent acid cleaning, autoclave reaction, and LAH reaction (Center+LAH). The Center+LAH quantum dots experience a red shift relative to Center. Similarly, the Freedom_R quantum dots prepared at ~70° C. are slightly blue shifted (511 nm) relative to Freedom quantum dots (515 nm) prepared at >70° C. temperature. These observations of red shift and blue shift of the fluorescence signal suggest that the optical properties of the quantum dots from ND lignite can be tuned by their preparation methods and by treatment of the coal feedstocks.

Figure 12:
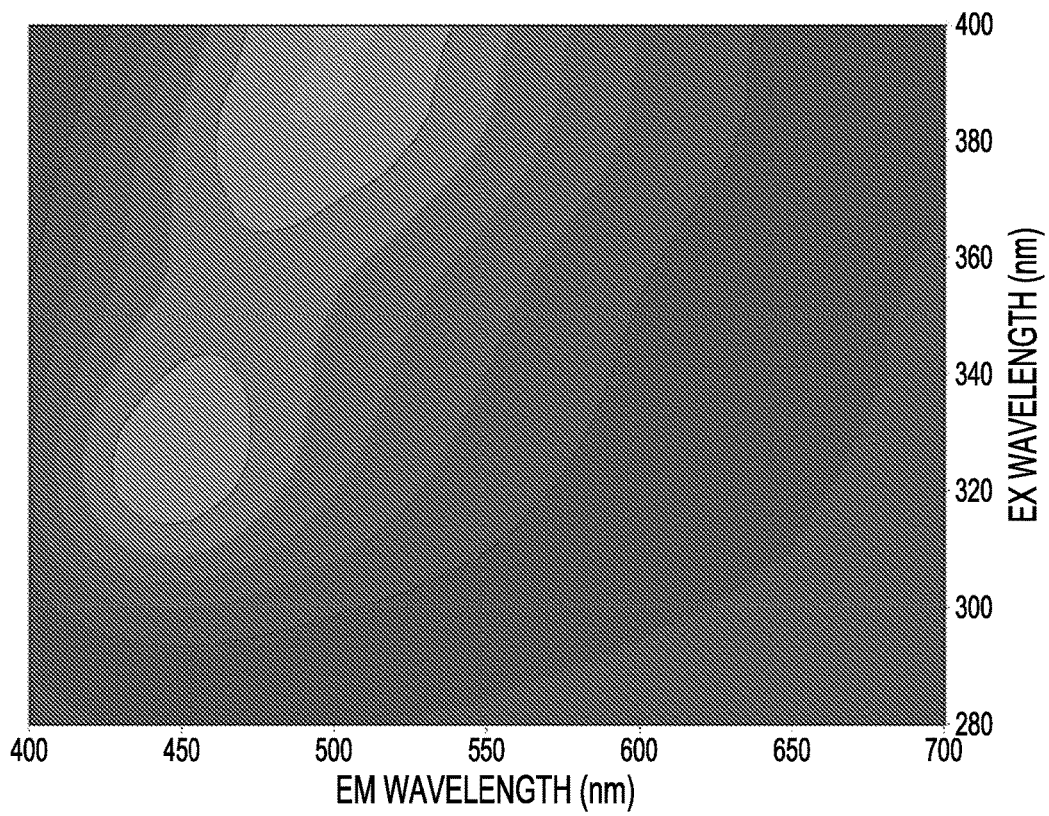
FIG. 12 illustrates a 3-D fluorescence map of Center lignite-derived GQDs, in accordance with various embodiments.

3-D fluorescence maps were also obtained for each sample to show if a sample has multiple emission maxima at different UV excitation wavelengths. An example 3-D map is presented in FIG. 12 for Center lignite-derived GQDs. It is observed that there are two emission peaks around 450 nm and 498 nm corresponding to UV excitation at ~325 nm and 395 nm, respectively. Similar 3-D fluorescence maps (not shown) were obtained at 395-nm excitation for Falkirk and Freedom quantum dots, with emission maxima at ~513 nm and ~515 nm, respectively.

Figure 13:
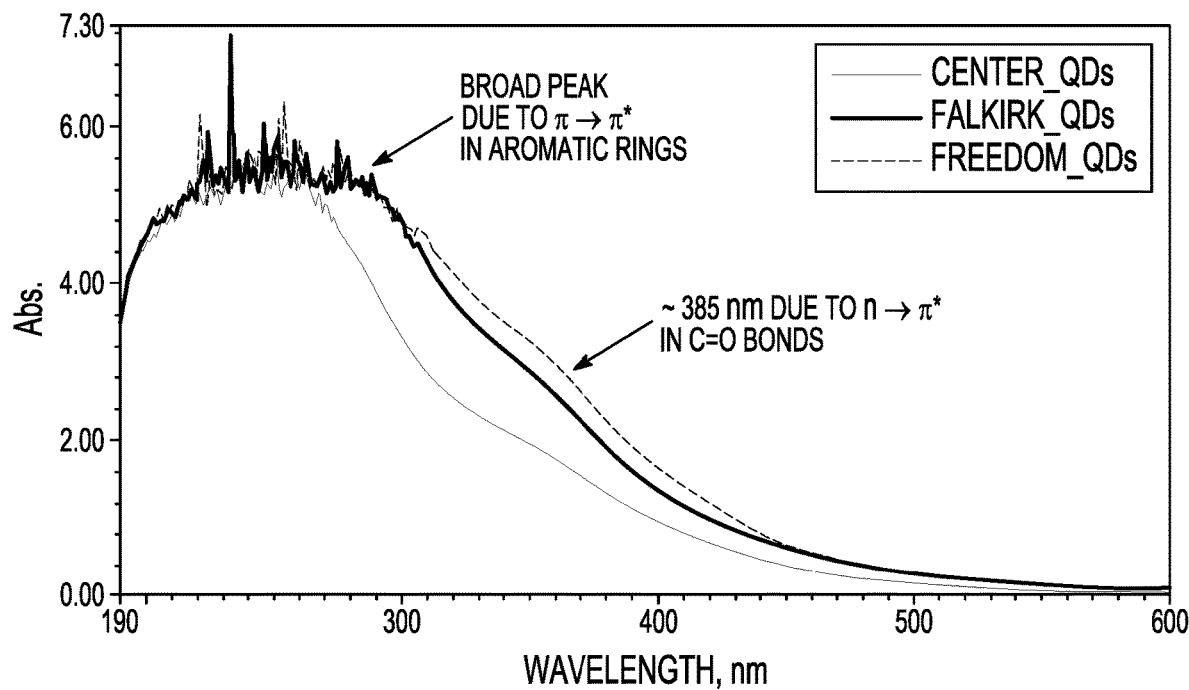
FIG. 13 illustrates UV-vis spectra of ND lignite-derived GQDs, in accordance with various embodiments.
Figure 14:
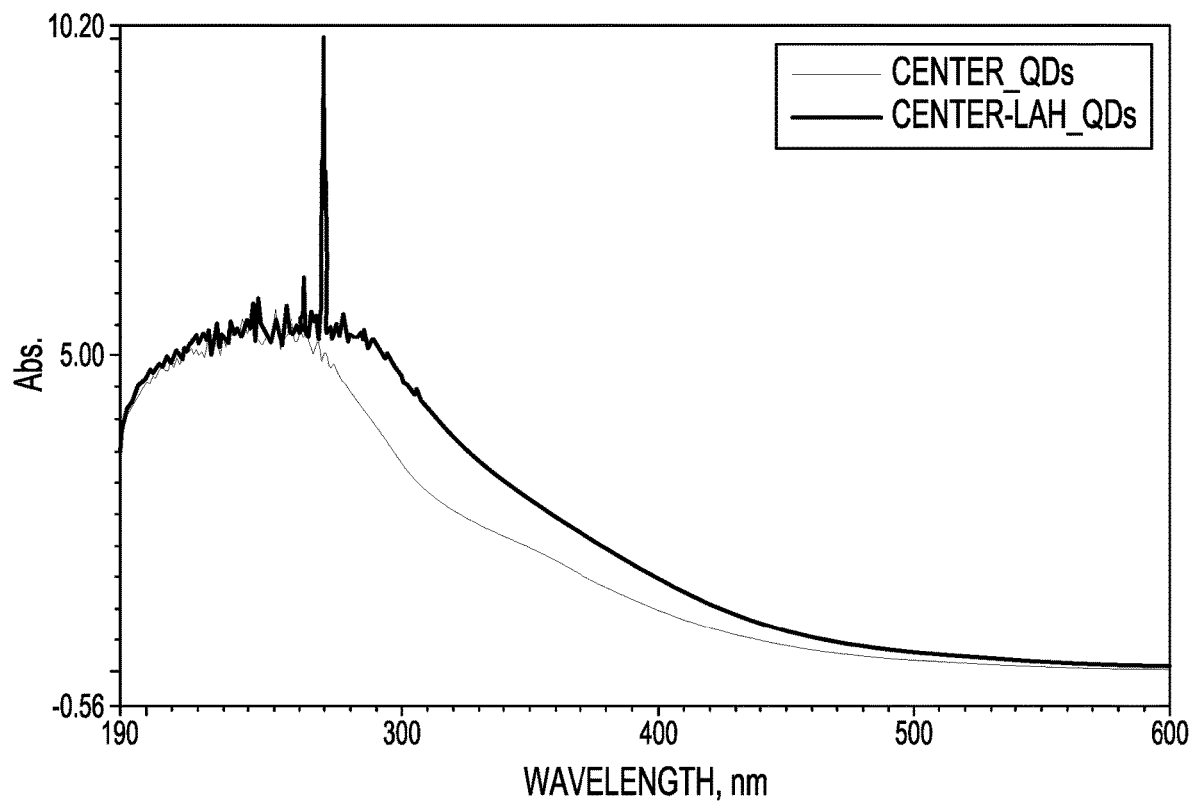
FIG. 14 illustrates US-vis spectra showing differences of GQDs prepared from modified precursors, in accordance with various embodiments.

UV-vis absorption spectra for the Center, Falkirk, and Freedom lignite GQDs are shown in FIG. 13. Two absorption bands are observed in the range 200-300 nm and around 358 nm, representing the $\pi \rightarrow \pi^*$ and $n \rightarrow \pi^*$ transitions, respectively. FIG. 14 further illustrates the disappearance of the shoulder peak at 358 nm when the coal was reacted with LAH reagent. This observation is consistent with the fact that LAH reactions reduce the C═O multiple bonds, thereby eliminating the possibility of $n \rightarrow \pi^*$ transitions. Thus, UV-vis spectroscopy can be used to not only characterize the optical properties of GQDs but also determine their structural attributes. The removal of the shoulder peak at ~358 nm following LAH reactions allows the optical properties to be tuned to make variants of GQDs that can be tailored for specific applications. Tunability of the optical properties is also supported by the intensity changes observed in FIG. 11 for Center spectrum compared to Center+LAH spectrum.

The terms and expressions that have been employed are used as terms of description and not of limitation, and there is no intention in the use of such terms and expressions of excluding any equivalents of the features shown and described or portions thereof, but it is recognized that various modifications are possible within the scope of the embodiments of the present invention. Thus, it should be understood that although the present invention has been specifically disclosed by specific embodiments and optional features, modification and variation of the concepts herein disclosed may be resorted to by those of ordinary skill in the art, and that such modifications and variations are considered to be within the scope of embodiments of the present invention.

EXEMPLARY EMBODIMENTS

The following exemplary embodiments are provided, the numbering of which is not to be construed as designating levels of importance:

Embodiment 1 provides a method of upgrading coal, the method comprising:
cleaning coal to form a cleaned coal residue; and
at least one of
reacting the cleaned coal residue with an oxidizable inorganic metallic agent, and,
reacting the cleaned coal residue with a reducing agent, to form the upgraded coal.

Embodiment 2 provides the method of Embodiment 1, wherein the coal that is cleaned is a crushed coal or a particulate coal.

Embodiment 3 provides the method of Embodiment 2, wherein the crushed or particulate coal has a largest dimension of 25 mm or less.

Embodiment 4 provides the method of any one of Embodiments 2-3, wherein the crushed or particulate coal has a largest dimension of 1 micron to 25 mm.

Embodiment 5 provides the method of any one of Embodiments 2-4, wherein the crushed or particulate coal has a largest dimension of 1 micron to 10 mm.

Embodiment 6 provides the method of any one of Embodiments 1-5, wherein the cleaning of the coal comprises cleaning the coal with a mineral acid, cleaning the coal with a base, physically cleaning the coal, or a combination thereof.

Embodiment 7 provides the method of any one of Embodiments 1-6, wherein the cleaning of the coal comprises cleaning the coal with a base.

Embodiment 8 provides the method of any one of Embodiments 1-7, wherein the cleaning of the coal comprises physically cleaning the coal.

Embodiment 9 provides the method of Embodiment 8, wherein the physical cleaning comprises suspending the coal in an aqueous solution.

Embodiment 10 provides the method of any one of Embodiments 8-9, wherein the aqueous solution comprises a cesium chloride solution.

Embodiment 11 provides the method of any one of Embodiments 8-10, wherein the aqueous solution has a specific gravity of 1-2.

Embodiment 12 provides the method of any one of Embodiments 8-11, wherein the aqueous solution has a specific gravity of 1.4 to 1.6.

Embodiment 13 provides the method of any one of Embodiments 1-12, wherein the cleaning of the coal comprises cleaning the coal with a mineral acid.

Embodiment 14 provides the method of Embodiment 13, wherein the cleaning with the mineral acid removes one or more inorganic elements, thereby reducing the ash content of the coal.

Embodiment 15 provides the method of any one of Embodiments 13-14, wherein the mineral acid comprises phosphoric acid, sulfuric acid, boric acid, hydrofluoric acid, hydrobromic acid, perchloric acid, hydrochloric acid, nitric acid, or a combination thereof.

Embodiment 16 provides the method of any one of Embodiments 13-15, wherein the mineral acid comprises hydrochloric acid, nitric acid, or a combination thereof.

Embodiment 17 provides the method of any one of Embodiments 13-16, wherein the mineral acid comprises hydrochloric acid.

Embodiment 18 provides the method of any one of Embodiments 13-17, wherein the mineral acid comprises nitric acid.

Embodiment 19 provides the method of any one of Embodiments 13-18, wherein the mineral acid is 0.1 M to 10 M.

Embodiment 20 provides the method of any one of Embodiments 13-19, wherein the mineral acid is 1 M to 5 M.

Embodiment 21 provides the method of any one of Embodiments 13-20, wherein the mineral acid is 1 M to 1.5 M.

Embodiment 22 provides the method of any one of Embodiments 13-21, wherein a ratio of a volume of the mineral acid to a weight of the coal is 1:10 to 10:1.

Embodiment 23 provides the method of any one of Embodiments 13-22, wherein a ratio of a volume of the mineral acid to a weight of the coal is 2:1 to 4:1.

Embodiment 24 provides the method of any one of Embodiments 13-23, wherein the coal is cleaned with the mineral acid at a temperature of 30° C. to 100° C.

Embodiment 25 provides the method of any one of Embodiments 13-24, wherein the coal is cleaned with the mineral acid at a temperature of 60° C. to 80° C.

Embodiment 26 provides the method of any one of Embodiments 13-25, wherein the coal is cleaned with the mineral acid for a duration of 1 h to 72 h.

Embodiment 27 provides the method of any one of Embodiments 13-26, wherein the coal is cleaned with the mineral acid for a duration of 12 h to 36 h.

Embodiment 28 provides the method of any one of Embodiments 13-27, wherein the coal is cleaned with the mineral acid at atmospheric pressure.

Embodiment 29 provides the method of any one of Embodiments 13-28, wherein the method further comprises washing the cleaned coal residue with an aqueous liquid after the acid washing to wash the acid from the cleaned coal residue.

Embodiment 30 provides the method of any one of Embodiments 1-29, wherein the method further comprises drying the cleaned coal residue to remove water therefrom.

Embodiment 31 provides the method of any one of Embodiments 1-30, wherein the method further comprises crushing the cleaned coal residue to a smaller size than the coal prior to cleaning, wherein the smaller size comprises a largest dimension of 500 microns or less.

Embodiment 32 provides the method of Embodiment 31, wherein the smaller size comprises a largest dimension of 1 micron to 100 microns.

Embodiment 33 provides the method of any one of Embodiments 1-32, wherein the reacting of the cleaned coal residue with the oxidizable inorganic metallic agent is performed.

Embodiment 34 provides the method of Embodiment 33, wherein the reacting of the cleaned coal residue with the oxidizable inorganic metallic agent removes heteroatoms therefrom.

Embodiment 35 provides the method of Embodiment 34, wherein the heteroatoms comprise oxygen, sulfur, or a combination thereof.

Embodiment 36 provides the method of any one of Embodiments 33-35, wherein the reacting of the cleaned coal residue with the oxidizable inorganic metallic agent is performed in an autoclave.

Embodiment 37 provides the method of any one of Embodiments 33-36, wherein the oxidizable inorganic metallic agent comprises a salt comprising iron(II), cerium (III), manganese(II), cobalt(II), chromium(III), copper(I), tin(II), or a combination thereof.

Embodiment 38 provides the method of any one of Embodiments 33-37, wherein the oxidizable inorganic metallic agent comprises iron sulfate or a hydrate thereof.

Embodiment 39 provides the method of any one of Embodiments 33-38, wherein the oxidizable inorganic metallic agent comprises iron (II) sulfate heptahydrate ($FeSO_4 \cdot 7H_2O$).

Embodiment 40 provides the method of any one of Embodiments 33-39, wherein the oxidizable inorganic metallic agent comprises iron chloride or a hydrate thereof.

Embodiment 41 provides the method of any one of Embodiments 33-40, wherein the oxidizable inorganic metallic agent comprises iron (II) chloride tetrahydrate ($FeCl \cdot 4H_2O$).

Embodiment 42 provides the method of any one of Embodiments 33-41, wherein the reaction of the cleaned coal residue with the oxidizable inorganic metallic agent is performed at 100° C. to 500° C.

Embodiment 43 provides the method of any one of Embodiments 33-42, wherein the reaction of the cleaned coal residue with the oxidizable inorganic metallic agent is performed at 250° C. to 350° C.

Embodiment 44 provides the method of any one of Embodiments 33-43, wherein the reaction of the cleaned coal residue with the oxidizable inorganic metallic agent is performed in an aqueous solvent.

Embodiment 45 provides the method of any one of Embodiments 33-44, wherein the reaction of the cleaned coal residue with the oxidizable inorganic metallic agent is performed under an inert gas.

Embodiment 46 provides the method of any one of Embodiments 33-45, wherein the reaction of the cleaned coal residue with the oxidizable inorganic metallic agent is performed under argon.

Embodiment 47 provides the method of any one of Embodiments 33-46, wherein the reaction of the cleaned coal residue with the oxidizable inorganic metallic agent is performed in an environment that has been evacuated and flushed with an inert gas one or more times.

Embodiment 48 provides the method of any one of Embodiments 33-47, wherein the reaction of the cleaned coal residue with the oxidizable inorganic metallic agent is performed in the substantial absence of oxygen.

Embodiment 49 provides the method of any one of Embodiments 33-48, wherein the reaction of the cleaned coal residue with the oxidizable inorganic metallic agent is performed for a duration of 30 min to 5 h.

Embodiment 50 provides the method of any one of Embodiments 33-49, wherein the reaction of the cleaned coal residue with the oxidizable inorganic metallic agent is performed for a duration of 1 h to 3 h.

Embodiment 51 provides the method of any one of Embodiments 33-50, wherein after the reaction of the cleaned coal residue with the oxidizable inorganic metallic agent, the reaction mixture is actively or passively cooled to room temperature.

Embodiment 52 provides the method of any one of Embodiments 33-51, wherein after the reaction of the cleaned coal residue with the oxidizable inorganic metallic agent, the cleaned coal residue is washed with water one or more times.

Embodiment 53 provides the method of any one of Embodiments 33-52, wherein after the reaction of the cleaned coal residue with the oxidizable inorganic metallic agent, the cleaned coal residue is dried to remove water therefrom.

Embodiment 54 provides the method of any one of Embodiments 1-53, wherein the reacting of the cleaned coal residue with the reducing agent is performed.

Embodiment 55 provides the method of Embodiment 54, wherein the reacting of the cleaned coal residue with the reducing agent removes organic functional groups from the cleaned coal residue.

Embodiment 56 provides the method of Embodiment 55, wherein the organic functional groups comprise carboxylic acids, carbonyl groups, ethers, aliphatic groups, or a combination thereof.

Embodiment 57 provides the method of any one of Embodiments 54-56, wherein the reacting of the cleaned coal residue with the reducing agent reduces C=O groups in the cleaned coal residue.

Embodiment 58 provides the method of any one of Embodiments 54-57, wherein the reducing agent comprises lithium aluminum hydride, sodium borohydride, diborane, 9-BBN, aluminum hydride, lithium borohydride, diisobutylaluminum hydride, or a combination thereof.

Embodiment 59 provides the method of any one of Embodiments 54-58, wherein the reducing agent comprises lithium aluminum hydride (LAH).

Embodiment 60 provides the method of any one of Embodiments 54-59, wherein the reacting of the cleaned coal residue with the reducing agent is conducted at 0° C. to 50° C.

Embodiment 61 provides the method of any one of Embodiments 54-60, wherein the reacting of the cleaned coal residue with the reducing agent is conducted at room temperature.

Embodiment 62 provides the method of any one of Embodiments 54-61, wherein the reacting of the cleaned coal residue with the reducing agent is conducted for a duration of 1 min to 24 h.

Embodiment 63 provides the method of any one of Embodiments 54-62, wherein the reacting of the cleaned coal residue with the reducing agent is conducted for a duration of 10 min to 30 min.

Embodiment 64 provides the method of any one of Embodiments 54-63, wherein the reacting of the cleaned coal residue with the reducing agent is performed in an organic solvent.

Embodiment 65 provides the method of any one of Embodiments 54-64, wherein the reacting of the cleaned coal residue with the reducing agent is performed in diethylether.

Embodiment 66 provides the method of any one of Embodiments 54-65, further comprising working up the product of the reacting of the cleaned coal residue with the reducing agent with water.

Embodiment 67 provides the method of any one of Embodiments 54-66, further comprising drying the cleaned coal residue after performing the reacting of the cleaned coal residue with the reducing agent.

Embodiment 68 provides the method of any one of Embodiments 1-67, wherein both the reacting of the cleaned coal residue with the oxidizable inorganic metallic agent and the reacting of the cleaned coal residue with the reducing agent are performed.

Embodiment 69 provides the method of Embodiment 68, wherein the reacting of the cleaned coal residue with the oxidizable inorganic metallic agent is performed before the reacting of the cleaned coal residue with the reducing agent.

Embodiment 70 provides the method of any one of Embodiments 68-69, wherein the reacting of the cleaned coal residue with the oxidizable inorganic metallic agent is performed after the reacting of the cleaned coal residue with the reducing agent.

Embodiment 71 provides the method of any one of Embodiments 1-70, wherein the upgraded coal comprises an ash content of less than 5 wt %.

Embodiment 72 provides the method of any one of Embodiments 1-70, wherein the upgraded coal comprises an ash content of 0.5 to 2 wt %.

Embodiment 73 provides the method of any one of Embodiments 1-72, wherein the upgraded coal comprises an ash content that is 4 wt % to 15 wt % lower than an ash content of the coal prior to the cleaning.

Embodiment 74 provides the method of any one of Embodiments 1-73, wherein the upgraded coal comprises an oxygen content that is lower than an oxygen content of the coal prior to the cleaning.

Embodiment 75 provides the method of any one of Embodiments 1-74, wherein the upgraded coal comprises 1% to 50% less oxygen concentration than the coal prior to the cleaning.

Embodiment 76 provides the method of any one of Embodiments 1-75, wherein the upgraded coal comprises 15% to 25% less oxygen concentration than the coal prior to the cleaning.

Embodiment 77 provides the method of any one of Embodiments 1-76, wherein the upgraded coal comprises an oxygen concentration of 10 wt % to 25 wt %.

Embodiment 78 provides the method of any one of Embodiments 1-77, wherein the upgraded coal comprises 1% to 30% higher carbon concentration than the coal prior to the cleaning.

Embodiment 79 provides the method of any one of Embodiments 1-78, wherein the upgraded coal comprises 5% to 15% higher carbon concentration than the coal prior to the cleaning.

Embodiment 80 provides the method of any one of Embodiments 1-79, wherein the upgraded coal comprises a carbon concentration of 40 wt % to 75 wt %.

Embodiment 81 provides the method of any one of Embodiments 1-80, further comprising forming a graphene film from the upgraded coal.

Embodiment 82 provides a graphene film formed by the method of Embodiment 81.

Embodiment 83 provides the method of any one of Embodiments 1-81, further comprising forming a graphene quantum dot from the upgraded coal.

Embodiment 84 provides a graphene quantum dot formed by the method of Embodiment 83.

Embodiment 85 provides a method of upgrading coal, the method comprising:

cleaning coal having a largest dimension of 25 mm or less using a strong mineral acid at a temperature of 30° C. to 100° C. to form a cleaned coal residue; and at least one of reacting the cleaned coal residue at 100° C. to 500° C. under an inert gas with an oxidizable inorganic metallic agent comprising iron (II) sulfate heptahydrate ($FeSO_4 \cdot 7H_2O$), iron (II) chloride tetrahydrate ($FeCl \cdot 4H_2O$), or a combination thereof, and, reacting the cleaned coal residue at 0° C. to 50° C. in an organic solvent with a reducing agent comprising lithium aluminum hydride (LAH), sodium borohydride (NAH), or a combination thereof, to form the upgraded coal;

wherein the upgraded coal has a lower ash content, as compared to the coal used to form the upgraded coal, and the upgraded coal has at least one of a lower oxygen concentration and a higher carbon concentration, as compared to the naturally-sourced coal used to form the upgraded coal.

Embodiment 86 provides an upgraded coal formed by the method of any one of Embodiments 1-80.

Embodiment 87 provides an upgraded coal comprising:

an ash content of less than 5 wt %;

an oxygen concentration of 10 wt % to 25 wt %; and a carbon concentration of 40 wt % to 75 wt %.

Embodiment 88 provides the upgraded coal of Embodiment 87, wherein the upgraded coal has a lower ash content, as compared to the naturally-sourced coal used to form the upgraded coal; and at least one of a lower oxygen concentration and a higher carbon concentration, as compared to the naturally-sourced coal used to form the upgraded coal.

Embodiment 89 provides a graphene film formed from the upgraded coal of any one of Embodiments 87-88.

Embodiment 90 provides a graphene quantum dot formed from the upgraded coal of any one of Embodiments 87-88.

Embodiment 91 provides a graphene quantum dot comprising one or more fluorescence emission maxima at 395 nm excitation of 450 nm to 550 nm.

Embodiment 92 provides the graphene quantum dot of Embodiment 91, comprising one or more fluorescence emission maxima at 395 nm excitation of 490 nm to 520 nm.

Embodiment 93 provides the method, upgraded coal, graphene film, or graphene quantum dot of any one or any combination of Embodiments 1-92 optionally configured such that all elements or options recited are available to use or select from.

What is claimed is:

1. A method of forming a graphene quantum dot, the method comprising:

forming the graphene quantum dot from upgraded coal, wherein the upgraded coal has a lower oxygen concentration as compared to naturally-sourced coal used to form the upgraded coal, and wherein the upgraded coal comprises an ash content of less than 5 wt %, an oxygen concentration of 10 wt % to 25 wt %, and a carbon concentration of 40 wt % to 75 wt %.

2. The method of claim 1, wherein the forming of the graphene quantum dot comprises a solution-based method.

3. The method of claim 1, wherein the forming of the graphene quantum dot comprises reacting the upgraded coal with acid under heating; and neutralizing the acidified upgraded coal, to form the graphene quantum dot in solution.

4. The method of claim 3, wherein the acid comprises nitric acid, sulfuric acid, or a combination thereof.

5. The method of claim 3, further comprising filtering the neutralized acidified upgraded coal to remove impurities from the graphene quantum dot.

6. The method of claim 3, further comprising precipitating impurities from the neutralized acidified upgraded coal and removing the precipitate from the graphene quantum dot.

7. The method of claim 1, wherein the upgraded coal comprises:

an ash content of 0.5 wt % to 2 wt %.

8. The method of claim 1, further comprising:

cleaning a naturally-sourced coal to form a cleaned coal residue; and at least one of reacting the cleaned coal residue with an oxidizable inorganic metallic agent, and reacting the cleaned coal residue with a reducing agent, to form the upgraded coal.

9. The method of claim 8, wherein the upgraded coal has an oxygen concentration that is 15% to 25% lower than an oxygen concentration of the naturally-sourced coal used to form the upgraded coal.

10. The method of claim 8, wherein:

the upgraded coal comprises an ash content that is 4 wt % to 15 wt % lower than an ash content of the coal prior to the cleaning and that is less than 5 wt %; or the upgraded coal comprises 1% to 50% less oxygen concentration than the coal prior to the cleaning; or the upgraded coal comprises 1% to 30% higher carbon concentration than the coal prior to the cleaning; or a combination thereof.

11. The method of claim 8, wherein the cleaning of the coal comprises cleaning the coal with a mineral acid, cleaning the coal with a base, physically cleaning the coal, or a combination thereof.

12. The method of claim 8, wherein the reacting of the cleaned coal residue with the oxidizable inorganic metallic agent is performed, and wherein the reaction of the cleaned coal residue with the oxidizable inorganic metallic agent is performed at 100° C. to 500° C.

13. The method of claim 12, wherein the oxidizable inorganic metallic agent comprises iron (II) sulfate heptahydrate ($FeSO_4 \cdot 7H_2O$), iron (II) chloride tetrahydrate ($FeCl \cdot 4H_2O$), or a combination thereof.

14. The method of claim 8, wherein the reacting of the cleaned coal residue with the reducing agent is performed.

15. The method of claim 14, wherein the reducing agent comprises lithium aluminum hydride, sodium borohydride, diborane, 9-BBN, aluminum hydride, lithium borohydride, diisobutylaluminum hydride, or a combination thereof.

16. The method of claim 8, wherein both the reacting of the cleaned coal residue with the oxidizable inorganic metallic agent and the reacting of the cleaned coal residue with the reducing agent are performed.

17. The method of claim 1, wherein the graphene quantum dot comprises one or more fluorescence emission maxima at 395 nm excitation of 450 nm to 550 nm.

18. The method of claim 1, wherein the one or more fluorescence emission maxima at 395 nm excitation are 490 nm to 520 nm.

19. A method of forming a graphene quantum dot, the method comprising:

reacting a coal residue with a reducing agent to form an upgraded coal, wherein the upgraded coal has a lower oxygen concentration as compared to a naturally-sourced coal used to form the coal residue; and forming the graphene quantum dot from the upgraded coal.

20. The method of claim 1, wherein the upgraded coal has a sulfur concentration of 0.1 wt % to 5 wt %.

\* \* \* \* \*